US009075459B2

(12) United States Patent
Matsuzawa et al.

(10) Patent No.: US 9,075,459 B2
(45) Date of Patent: Jul. 7, 2015

(54) IMAGING APPARATUS, IMAGING METHOD, AND COMPUTER-READABLE STORAGE MEDIUM PROVIDING A TOUCH PANEL DISPLAY USER INTERFACE

(75) Inventors: Yoshinori Matsuzawa, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 83 days.

(21) Appl. No.: 13/540,789

(22) Filed: Jul. 3, 2012

(65) Prior Publication Data

US 2013/0010170 A1 Jan. 10, 2013

(30) Foreign Application Priority Data

Jul. 7, 2011 (JP) .................................. 2011-151195

(51) Int. Cl.
H04N 5/232 (2006.01)
H04N 5/44 (2011.01)
G06F 3/041 (2006.01)
H04N 5/222 (2006.01)
H04N 5/235 (2006.01)

(52) U.S. Cl.
CPC .............. *G06F 3/041* (2013.01); *H04N 5/4403* (2013.01); *H04N 5/222* (2013.01); *H04N 5/23216* (2013.01); *H04N 5/23264* (2013.01); *H04N 5/23293* (2013.01); *H04N 5/2353* (2013.01)

(58) Field of Classification Search
CPC . H04N 5/23216; H04N 5/4403; H04N 5/445; H04N 5/44543
USPC ........................................ 348/333.01, 333.12
See application file for complete search history.

(56) References Cited

U.S. PATENT DOCUMENTS

| 7,034,881 | B1 * | 4/2006 | Hyodo et al. ............. 348/333.12 |
| 2006/0026521 | A1 * | 2/2006 | Hotelling et al. ............. 715/702 |
| 2009/0201261 | A1 * | 8/2009 | Day ............................. 345/173 |
| 2010/0020221 | A1 * | 1/2010 | Tupman et al. .......... 348/333.01 |
| 2010/0020222 | A1 * | 1/2010 | Jones et al. ............... 348/333.02 |
| 2010/0299638 | A1 * | 11/2010 | Choi ............................. 715/835 |
| 2011/0019058 | A1 * | 1/2011 | Sakai et al. ............... 348/333.01 |
| 2011/0032373 | A1 * | 2/2011 | Forutanpour et al. ....... 348/222.1 |
| 2011/0261213 | A1 * | 10/2011 | Rottler et al. ............... 348/211.6 |
| 2012/0050192 | A1 * | 3/2012 | Kobayashi .................... 345/173 |
| 2012/0192108 | A1 * | 7/2012 | Kolb ............................. 715/810 |
| 2014/0071063 | A1 * | 3/2014 | Kuscher et al. ................ 345/173 |

FOREIGN PATENT DOCUMENTS

| CN | 102023786 | 4/2011 |
| JP | 2008-508600 | 3/2008 |
| JP | 2008-508601 | 3/2008 |
| JP | 2008-104069 | 5/2008 |
| WO | WO 2006/020304 | 2/2006 |
| WO | WO 2006/020305 | 2/2006 |

OTHER PUBLICATIONS

Office Action from corresponding Japanese Patent Application Serial No. 2011-151195 mailed Mar. 3, 2015 (2 pgs.) with translation (4 ps.).

* cited by examiner

*Primary Examiner* — Nicholas Giles
*Assistant Examiner* — Abdelaaziz Tissire
(74) *Attorney, Agent, or Firm* — John C. Pokotylo; Straub & Pokotylo

(57) ABSTRACT

An imaging apparatus includes a control unit that sets a touch area corresponding to a periphery of an initial touch position on a touch panel as an area used for adjusting an image that is displayed at the initial touch position on the basis of a signal that is output by the touch panel disposed in connection with a display unit.

15 Claims, 22 Drawing Sheets

IMAGING APPARATUS, IMAGING METHOD, AND COMPUTER-READABLE STORAGE MEDIUM PROVIDING A TOUCH PANEL DISPLAY USER INTERFACE

CROSS-REFERENCE TO RELATED APPLICATIONS

This application is based upon and claims the benefit of priority from Japanese Patent Application No. 2011-151195, filed on Jul. 7, 2011, the entire contents of which are incorporated herein by reference.

BACKGROUND OF THE INVENTION

1. Field of the Invention

The present invention relates to an imaging apparatus, an imaging method, and a program that generate image data by imaging a subject and performing photoelectric conversion.

2. Description of the Related Art

Recently, in imaging apparatuses such as digital cameras, a touch panel is arranged on the display screen of a display unit that displays an image, and a user can perform an operation relating to capturing an image by using the touch panel.

In addition, a technique is known in which the number or the operation of fingers touching the display screen of a touch panel is detected, and an operation content corresponding to a result of the detection is performed (see Japanese Laid-open Patent Publication No. 2008-508601).

SUMMARY OF THE INVENTION

An imaging apparatus according to an aspect of the invention includes a control unit that sets a touch area corresponding to a periphery of an initial touch position on a touch panel as an area used for adjusting an image that is displayed at the initial touch position on the basis of a signal that is output by the touch panel disposed in connection with a display unit.

An imaging method according to another aspect of the invention is an imaging method that is performed by an imaging apparatus including an imaging unit that generates image data of a subject by imaging the subject, a display unit that displays an image corresponding to the image data generated by the imaging unit, and a touch panel that is disposed on a display screen of the display unit, detects a touch of an object from the outside, and outputs a signal corresponding to a detected touch position, the imaging method including: displaying operating information relating to a capturing operation of the imaging apparatus in a display area of the display unit that corresponds to a periphery of an initial touch position on the touch panel on the basis of the signal output by the touch panel; and controlling a capturing operation of the imaging apparatus in accordance with the operating information corresponding to the detected touch position in a case where the touch panel detects a touch of an object from the outside on the display area of the operating information that is displayed in the display unit.

A computer-readable storage medium according to a further another aspect of the invention instructs a processor, which is included in an imaging apparatus including an imaging unit that generates image data of a subject by imaging the subject, a display unit that displays an image corresponding to the image data generated by the imaging unit, and a touch panel that is disposed on a display screen of the display unit, detects a touch of an object from the outside, and outputs a signal corresponding to a detected touch position, to perform: displaying operating information relating to a capturing operation of the imaging apparatus in a display area of the display unit that corresponds to a periphery of an initial touch position on the touch panel on the basis of the signal output by the touch panel; and controlling a capturing operation of the imaging apparatus in accordance with the operating information corresponding to the detected touch position in a case where the touch panel detects a touch of an object from the outside on the display area of the operating information that is displayed in the display unit.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
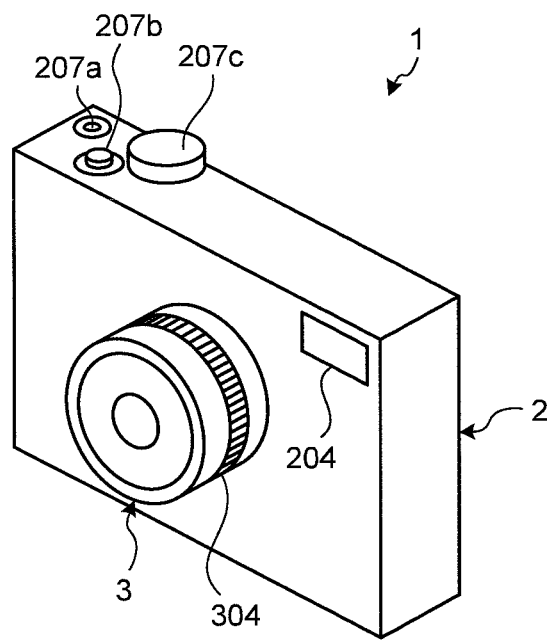
FIG. 1 is a perspective view that illustrates the side, which faces a subject, of an imaging apparatus according to a first embodiment of the invention.

Hereinafter, embodiments of the invention (hereinafter, referred to as "embodiments") will be described with reference to the drawings. In the description presented below, although a digital single lens reflex camera will be described as an example of an imaging apparatus according to the invention, the invention is not limited by the embodiments. In the drawings, the same reference numeral is assigned to the same part.

First Embodiment

Figure 2:
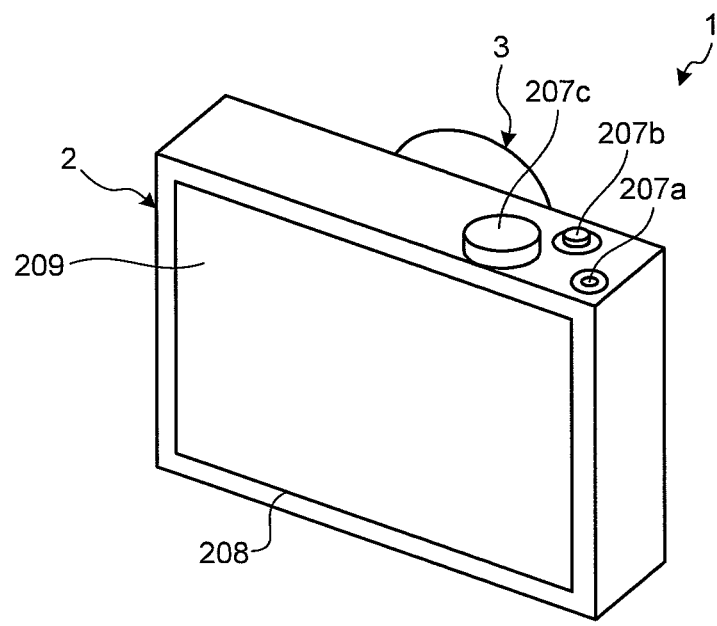
FIG. 2 is a perspective view that illustrates the side, which faces a photographer, of the imaging apparatus according to the first embodiment of the invention.
Figure 3:
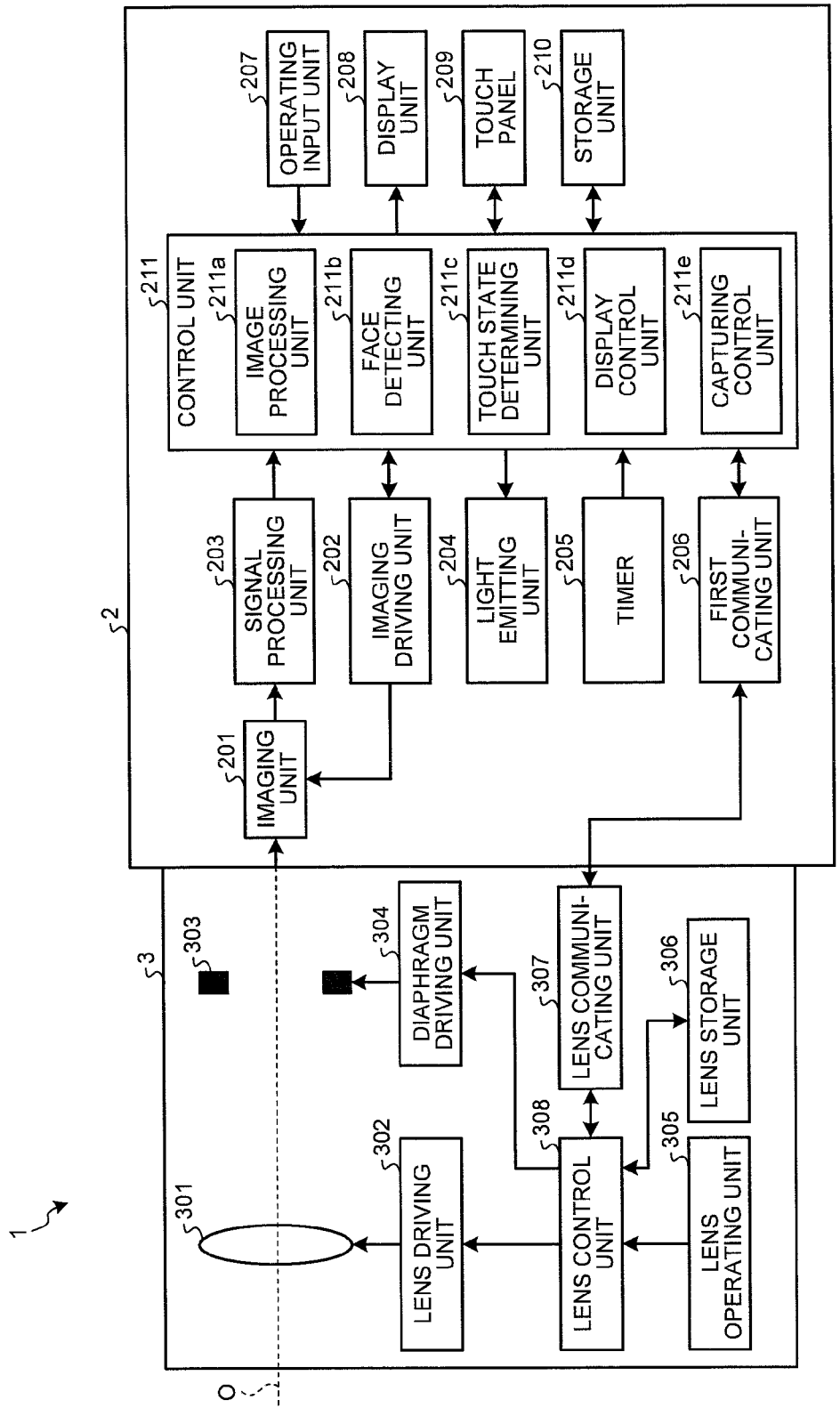
FIG. 3 is a block diagram that illustrates the configuration of the imaging apparatus according to the first embodiment of the invention.

FIG. 1 is a perspective view that illustrates the side (front face side), which faces a subject, of an imaging apparatus 1 according to a first embodiment of the invention. FIG. 2 is a perspective view that illustrates the side (rear face side), which faces a photographer, of the imaging apparatus 1 according to the first embodiment of the invention. FIG. 3 is a block diagram that illustrates the configuration of the imaging apparatus according to the first embodiment of the invention. The imaging apparatus 1 illustrated in FIGS. 1 to 3 includes a main body unit 2 and a lens unit 3 that is detachably attached to the main body unit 2.

As illustrated in FIGS. 1 to 3, the main body unit 2 includes an imaging unit 201, an imaging driving unit 202, a signal processing unit 203, a light emitting unit 204, a timer 205, a first communicating unit 206, an operating input unit 207, a display unit 208, a touch panel 209, a storage unit 210, and a control unit 211.

The imaging unit 201 is configured by using an imaging device such as a CCD (charge coupled device) or a CMOS (complementary metal oxide semiconductor) that receives light condensed by the lens unit 3 and converts the received light into an electric signal and a shutter.

The imaging driving unit 202 drives the imaging unit 201 in accordance with a release signal. For example, the imaging driving unit 202 outputs image data (analog signal) at predetermined timing from the imaging device of the imaging unit 201 to the signal processing unit 203.

The signal processing unit 203 generates digital image data (raw data) by performing signal processing such as amplification for the analog signal output from the imaging unit 201 and then performing A/D conversion for the processed signal and outputs the image data to the control unit 211.

The light emitting unit 204 is configured by using a xenon lamp, an LED (light emitting diode), or the like. The light emitting unit 204 emits light as auxiliary light toward a visual field area for which imaging is performed by the imaging apparatus 1.

The timer 205 has a time counting function and a function for determining the capturing date and time. In order to add date/time data to the image data acquired through imaging, the timer 205 outputs the date/time data to the control unit 211.

The first communicating unit 206 is a communication interface that is used for communicating with the lens unit 3 that is installed to the main body unit 2.

The operating input unit 207, as illustrated in FIGS. 1 and 2, includes a power switch 207a that is used for switching the power state of the imaging apparatus 1 to the on-state or the off-state, a release switch 207b that is used for inputting a release signal, which is used for an instruction for capturing a still screen, and a shooting mode change-over switch 207c that is used for performing switching between various shooting modes set by the imaging apparatus 1.

The display unit 208 is realized by using a display panel that is formed from a liquid crystal, organic EL (electro luminescence), or the like. The display unit 208 displays an image corresponding to image data. The display unit 208 displays operating information relating to a capturing operation of the imaging apparatus 1 or capturing information relating to capturing an image.

The touch panel 209 is disposed on the display screen of the display unit 208. The touch panel 209 detects a position that is touched by (in contact with) a photographer based on the information displayed on the display unit 208 and outputs a signal corresponding to the detected touch position to the control unit 211. Generally, as the types of a touch panel, there are a resistive membrane type, an electrostatic capacitance type, an optical type, and the like. This first embodiment can accommodate a touch panel of any type.

The storage unit 210 is realized by a semiconductor memory such as a flash memory or a DRAM (dynamic random access memory) that is fixedly disposed inside the imaging apparatus 1. The storage unit 210 stores various programs used for operating the imaging apparatus 1 and various kinds of data and parameters used during the execution of the programs, and the like. The storage unit 210 stores image data and stores information of lens units 3 that can be installed to the main body unit 2, correction information of the image data according to the type of the lens unit 3, and the like. In addition, the storage unit 210 may include a storage medium that can be read by a computer such as a memory card that is installed from the outside.

The control unit 211 is configured by using a CPU (central processing unit) or the like. The control unit 211 controls the overall operation of the imaging apparatus 1 by issuing an instruction, transmitting data, or the like to each unit configuring the imaging apparatus 1 in accordance with the instruction signal transmitted from the operating input unit 207, the position signal transmitted from the touch panel 209, and the like.

A detailed configuration of the control unit 211 will now be described. The control unit 211 includes an image processing unit 211a, a face detecting unit 211b, a touch state determining unit 211c, a display control unit 211d, and a capturing control unit 211e.

The image processing unit 211a performs various types of image processing for the image data that is input from the signal processing unit 203 and outputs the processed image data to the storage unit 210. More specifically, the image processing unit 211a performs image processing that includes at least edge enhancement, white balance, color correction, and $\gamma$ correction for the image data. The image processing unit 211a may compress the image data according to the JPEG (joint photographic experts group) system and store the compressed image data in the storage unit 210.

The face detecting unit 211b detects a human face that is included in an image corresponding to the image data through pattern matching. In addition, the face detecting unit 211b may detect not only a human face but also a face of a dog, a cat, or the like. Furthermore, the face detecting unit 211b may detect a human face by using a known technique other than the pattern matching.

The touch state determining unit 211c determines a touch state of the touch panel 209 based on a position signal that is output by the touch panel 209. More specifically, the touch state determining unit 211c detects a touch state in which a position within a predetermined range on the touch panel 209 from an initial touch position has been touched continuously for a predetermined time. For example, the touch state determining unit 211c determines whether or not a photographer has continuously touched an almost same position on the touch panel 209 by determining whether or not a position signal input from the touch panel 209 continuously represents a position within the predetermined range from the initial touch position of the touch panel 209 for a predetermined time (for example, one second).

When the imaging apparatus 1 captures an image, the display control unit 211d allows the display unit 208 to display operating information relating to the capturing operation of the imaging apparatus 1. Here, the operating information includes exposure value adjusting information that is used for adjusting the exposure value of the imaging apparatus 1, contrast adjusting information that is used for adjusting the contrast of the image, gray scale adjusting information that is used for adjusting the gray scale of the image, brightness adjusting information that is used for adjusting the brightness of the image, diaphragm value adjusting information that is used for adjusting the diaphragm value, and capturing sensitivity adjusting information that is used for adjusting the capturing sensitivity (ISO sensitivity). In addition, the display control unit 211d displays the operating information relating to the capturing operation of the imaging apparatus 1 in a display area of the display unit 208 that corresponds to the periphery of the initial touch position on the touch panel 209 based on a signal output by the touch panel 209. More specifically, in a case where a touch state is detected by the touch state determining unit 211c, in which a position within a predetermined range from the initial touch position on the touch panel 209 has been touched continuously for a predetermined time, the display control unit 211d displays a plurality of types of operating information relating to the capturing operation of the imaging apparatus 1, which can be selected, in a display area of the display unit 208 that corresponds to the periphery of the initial touch position. For example, the display control unit 211d allows the display unit 208 to display operating information in a display area of the display unit 208 that is located on the periphery of the touch position at which the touch panel 209 is touched by the photographer.

In a case where a release signal is input, the capturing control unit 211e performs control so as to start a still-screen capturing operation of the imaging apparatus 1. Here, the still-screen capturing operation of the imaging apparatus 1 represents an operation of performing predetermined processes for the image data output by the imaging unit 201 in accordance with driving the imaging driving unit 202 by using the signal processing unit 203 and the image processing unit 211a. The image data for which the processes have been performed as above is stored in the storage unit 210 by the capturing control unit 211e. In addition, in a case where the operating information is displayed on the display unit 208 by the display control unit 211d, when the touch panel 209 detects a touch of an object from the outside, the capturing control unit 211e controls the capturing operation of the imaging apparatus 1 in accordance with the operating information corresponding to the detected touch position. More specifically, in a case where a position on the display area of the operating information that is displayed by the display unit 208 is touched by a photographer, the capturing control unit 211e adjusts the capturing operation of the imaging apparatus 1, for example, the exposure value or the diaphragm in accordance with the operating information according to the position signal that is input from the touch panel 209.

The main body unit 2 having the above-described configuration may include an electronic viewfinder (EVF), an audio input/output function, and a communication function for communicating with an external personal computer (not illustrated in the figure) in two-ways through the Internet, and the like.

The lens unit 3 includes an optical system 301, a lens driving unit 302, a diaphragm 303, a diaphragm driving unit 304, a lens operating unit 305, a lens storage unit 306, a lens communicating unit 307, and a lens control unit 308.

The optical system 301 is configured by using a plurality of lenses including a zoom lens that changes an image angle, a focus lens that adjusts the focal position, and the like. The optical system 301 condenses light from a predetermined visual field area and forms an image with the condensed light in the imaging unit 201. The lens driving unit 302 is configured by using a stepping motor, a DC motor, or the like. The lens driving unit 302 changes the focal position, the image angle, and the like of the optical system 301 by moving the lens of the optical system 301 on an optical axis O.

The diaphragm 303 adjusts the exposure by limiting the amount of incidence of light that is condensed by the optical system 301. The diaphragm driving unit 304 is configured by a stepping motor or the like. The diaphragm driving unit 304 adjusts the amount of light incident to the imaging unit 201 by driving the diaphragm 303.

The lens operating unit 305 is a zoom ring or a focus ring that is disposed on the circumference of a lens barrel of the lens unit 3 and receives a signal that is used for operating lenses arranged inside the optical system 301 as an input. Here, the lens operating unit 305 may be a push-type switch or the like.

The lens storage unit 306 stores a control program that is used for determining the position or the movement of the optical system 301. The lens storage unit 306 stores the magnification, the focal distance, the aberration, the F value (No brightness), and the like of the optical system 301.

The lens communicating unit 307 is a communication interface that is used for communicating with a first communicating unit 206 of the main body unit 2 when the lens unit 3 is installed to the main body unit 2.

The lens control unit 308 is configured by using a CPU or the like. The lens control unit 308 controls the operation of the lens unit 3 in accordance with an instruction signal transmitted from the main body unit 2.

Figure 4:
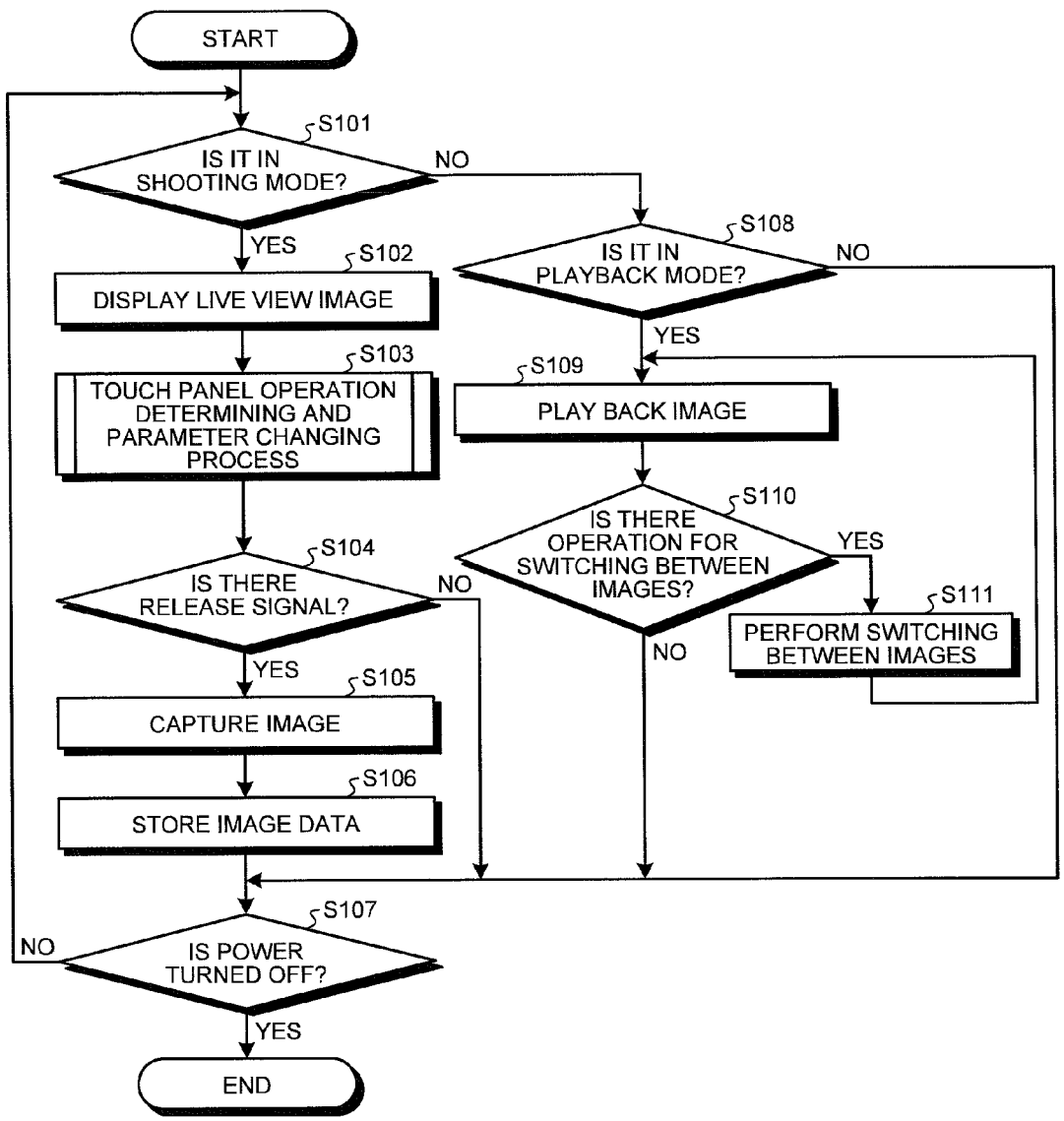
FIG. 4 is a flowchart that illustrates an overview of an operation that is performed by the imaging apparatus according to the first embodiment of the invention.

The operation that is performed by the imaging apparatus 1 having the above-described configuration will be described. FIG. 4 is a flowchart that illustrates an overview of an operation that is performed by the imaging apparatus 1 according to the first embodiment of the invention.

As illustrated in FIG. 4, first, a case will be described in which the imaging apparatus 1 is set to a shooting mode (Yes in Step S101). In such a case, the display control unit 211d allows the display unit 208 to display live view images that are consecutively generated at a predetermined minute time interval by the imaging unit 201 in Step S102.

Subsequently, a touch panel operation determining and parameter changing process is performed in which the content of the operation of a photographer for the touch panel 209 is determined in accordance with a position signal that is input from the touch panel 209, and parameters of the capturing operation are changed in accordance with the content of the operation in Step S103. The content of the touch panel operation determining and parameter changing process will be described later.

Thereafter, in a case where a release signal is input by operating the release switch 207b (Yes in Step S104), the capturing control unit 211e performs still-screen capturing in Step S105 and stores image data acquired through the capturing operation in the storage unit 210 in Step S106.

After Step S106, the control unit 211 determines whether or not the power of the imaging apparatus 1 is in the off-state by operating the power switch 207a in Step S107. In a case where the power of the imaging apparatus 1 is determined to be in the off-state by the control unit 211 (Yes in Step S107), the imaging apparatus 1 ends this process. On the other hand, in a case where the power of the imaging apparatus 1 is determined not to be in the off-state by the control unit 211 (No in Step S107), the imaging apparatus 1 returns the process to Step S101.

In Step S104, in a case where a release signal is not input through the release switch 207b (No in Step S104), the imaging apparatus 1 proceeds to Step S107.

Next, a case will be described in which the imaging apparatus 1 is not set to the shooting mode (No in Step S101), but the imaging apparatus 1 is set to a playback mode (Yes in Step S108). In such a case, the display control unit 211d plays back an image corresponding to the image data that is stored in the storage unit 210 on the display unit 208 in Step S109.

Subsequently, in a case where a switching operation of an image that is displayed on the display unit 208 is performed within a predetermined time (for example, three seconds) (Yes in Step S110), the display control unit 211d switches the image displayed on the display unit 208 to a next image in Step S111, and thereafter, the imaging apparatus 1 is returned to Step S109.

On the other hand, in a case where there is no operation of switching the image displayed on the display unit 208 within the predetermined time in Step S110 (No in Step S110), the imaging apparatus 1 proceeds to Step S107.

In Step S108, in a case where the imaging apparatus 1 is not set to the playback mode (No in Step S108), the imaging apparatus 1 proceeds to Step S107.

Figure 5:
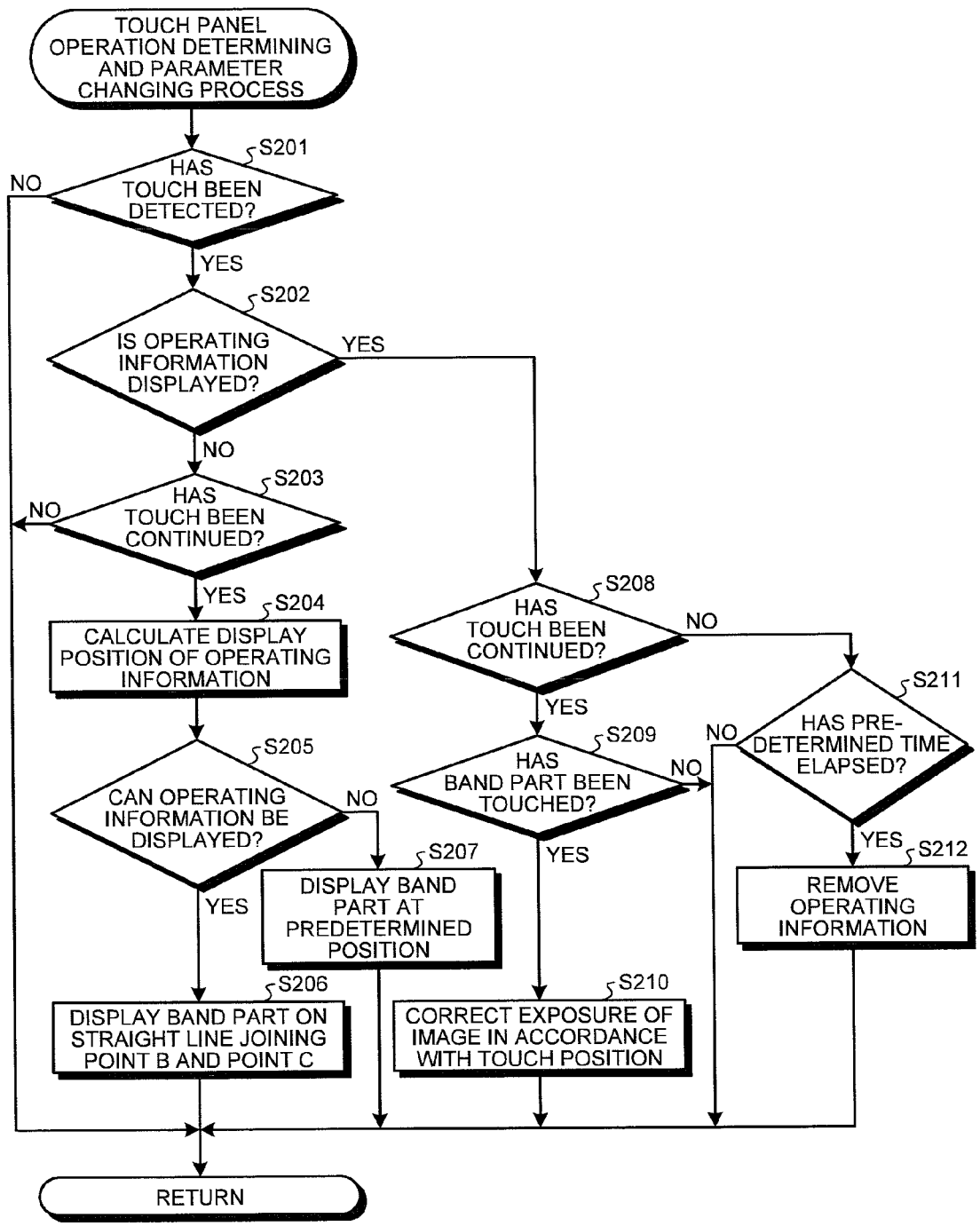
FIG. 5 is a flowchart that illustrates an overview of a touch panel operation determining and parameter changing process illustrated in FIG. 4.

Next, the touch panel operation determining and parameter changing process of Step S103 illustrated in FIG. 4 will be described. FIG. 5 is a flowchart that illustrates an overview of the touch panel operation determining and parameter changing process illustrated in FIG. 4.

As illustrated in FIG. 5, first, the control unit 211 determines whether or not a touch has been detected by the touch panel 209 in Step S201. There is also an imaging apparatus (camera) in which a specification for capturing an image by instantly optimizing the capturing parameters such as focus and exposure in an automatic manner through a predetermined sequence or calculation for a subject corresponding to a touch position is built. In order to maintain such specification without invalidating it, the control unit 211 may set the touch determining condition of S201 as a two-point touch (pinching operation). This similarly applies to the other embodiments to be described later. Although capturing parameters such as focus, exposure, and the like are assumed, it is apparent that the concept of this embodiment can be applied to the adjustment of an image other than a capturing process. In such a case, image adjustment may be automatically performed for an image portion corresponding to the touched position as an initial touch position. A touch position that is touched in accompaniment with the initial touch position for a two-point touch will be referred to as an auxiliary touch position.

Figure 6:
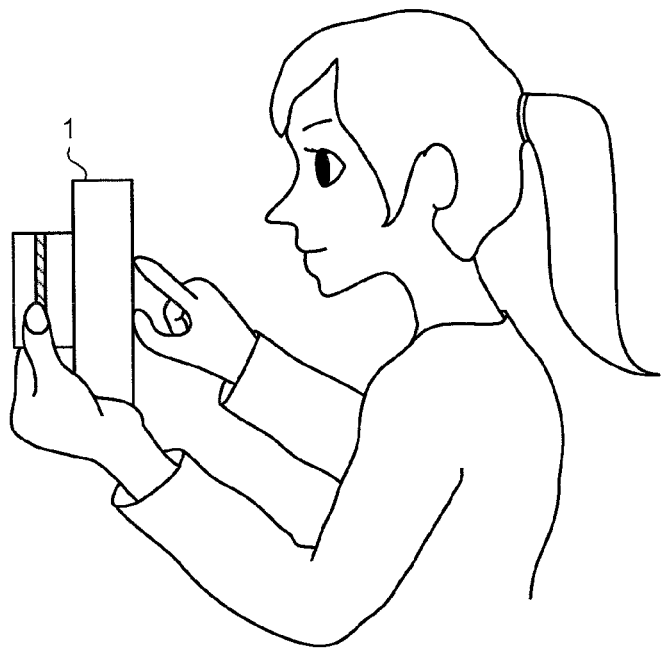
FIG. 6 is a diagram that illustrates a situation in which a photographer touches a touch panel when capturing an image using the imaging apparatus.
Figure 7:
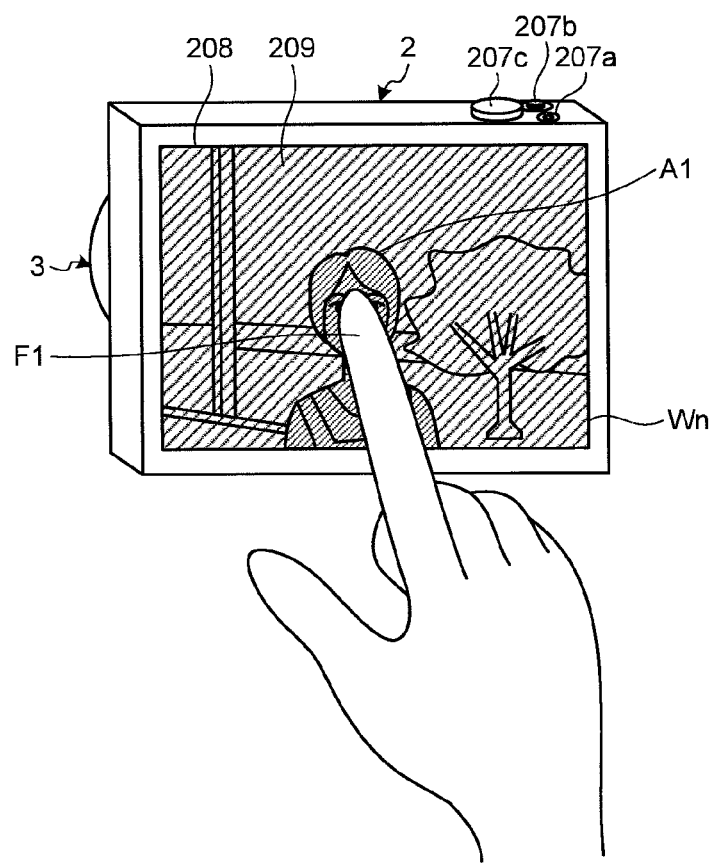
FIG. 7 is a perspective view that illustrates a rear face side of the imaging apparatus under the situation illustrated in FIG. 6.

FIG. 6 is a diagram that illustrates a situation in which a photographer touches the touch panel 209 when capturing an image using the imaging apparatus 1. FIG. 7 is a perspective view that illustrates a rear face side of the imaging apparatus 1 under the situation illustrated in FIG. 6. As illustrated in FIGS. 6 and 7, for example, the control unit 211 determines whether or not a main subject A1 located at the approximate center of a live view image Wn (here, n is a natural number) displayed by the display unit 208 is touched by a photographer with an index finger F1. More specifically, the control unit 211 determines whether or not a position signal has been input from the touch panel 209. In a case where the control unit 211 determines that a touch has been detected by the touch panel 209 (Yes in Step S201), the imaging apparatus 1 proceeds to Step S202 to be described later. On the other hand, in a case where the control unit 211 determines that a touch has not been detected by the touch panel 209 (No in Step S201), the imaging apparatus 1 returns the process to a main routine illustrated in FIG. 4.

In Step S202, the control unit 211 determines whether or not operating information relating to a capturing operation of the imaging apparatus 1, which can be selected, is displayed by the display unit 208. In a case where the control unit 211 determines that the operating information, which can be selected, relating to the capturing operation of the imaging apparatus 1 is displayed by the display unit 208 (Yes in Step S202), the imaging apparatus 1 proceeds to Step S208 to be described later. On the other hand, in a case where the control unit 211 determines that the operating information, which can be selected, relating to the capturing operation of the imaging apparatus 1 is not displayed by the display unit 208 (No in Step S202), the imaging apparatus 1 proceeds to Step S203 to be described below.

In Step S203, the touch state determining unit 211c determines whether or not an almost same position on the touch panel 209 is continuously touched by the photographer. More specifically, it is determined whether or not a position signal input from the touch panel 209 continuously represents almost a same position on the touch panel 209. At the time of performing a two-point touch the condition of the initial touch is determined for an upper point in the vertical (top and bottom) direction on the display. This is because the finger touching method as depicted in FIG. 6 is natural. The type of finger may be determined based on a fingerprint or a pressed area. A finger that is used as a supporting point and does not move may be determined as a finger that is used for selecting a subject (target object) as a target for which processing is performed. The position of the auxiliary touch can be determined from the initial touch position. A portion other than the determined position of the auxiliary touch is not controlled as described in the invention, whereby an incorrect operation is prevented.

In a case where the touch state determining unit 211c determines that almost the same position on the touch panel 209 is continuously touched by the photographer (Yes in Step S203), the imaging apparatus 1 proceeds to Step S204. On the other hand, in a case where the touch state determining unit 211c determines that almost a same position on the touch panel 209 is not continuously touched by the photographer (No in Step S203), the imaging apparatus 1 returns the process to the main routine illustrated in FIG. 4.

In Step S204, the display control unit 211d calculates the display position of operating information that is displayed on the display unit 208 based on the position signal that is input from the touch panel 209.

Figure 8:
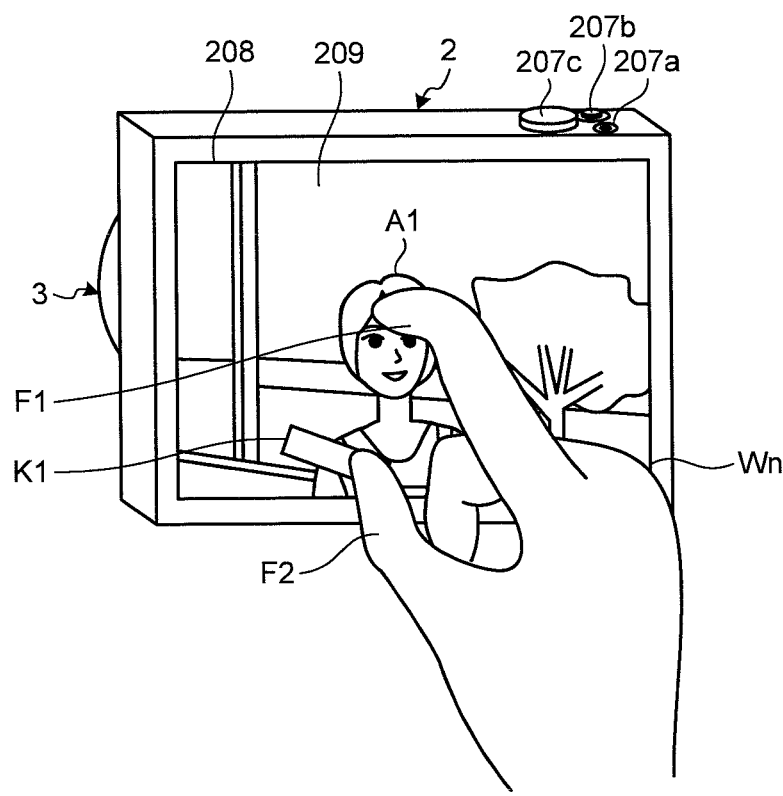
FIG. 8 is a diagram that schematically illustrates a display position of operating information that is displayed on a display unit by a display control unit.
Figure 13:
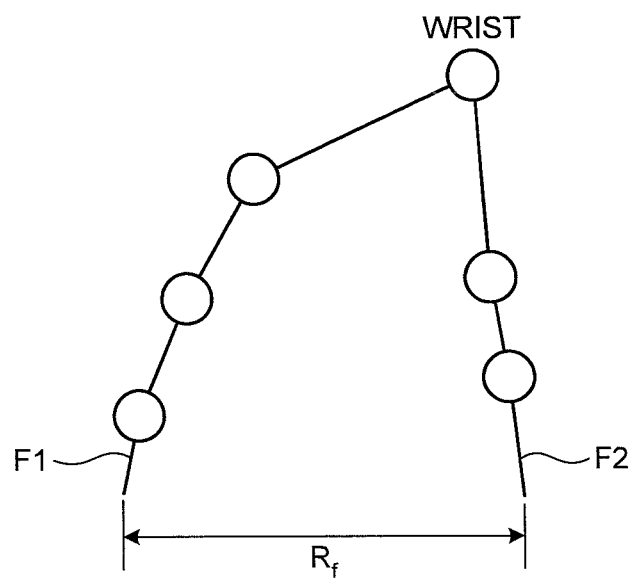
FIG. 13 is a diagram that schematically supplements the situations illustrated in FIGS. 9 to 11.
Figure 14:
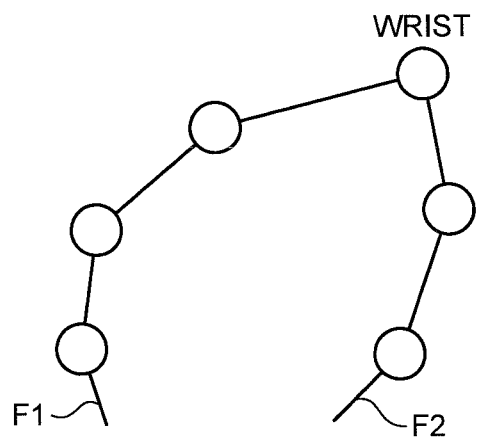
FIG. 14 is a diagram that schematically supplements the situations illustrated in FIGS. 9 to 11.
Figure 15:
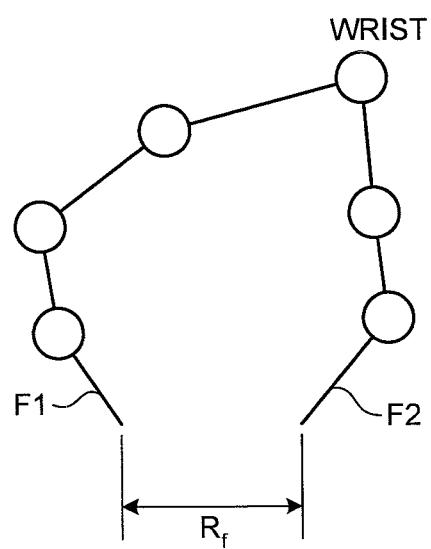
FIG. 15 is a diagram that schematically supplements the situations illustrated in FIGS. 9 to 11.

Here, a method of calculating the display position of operating information that is displayed on the display unit 208 by the display control unit 211d will be described. FIG. 8 is a diagram that schematically illustrates a display position of operating information that is displayed on the display unit 208 by the display control unit 211d. FIGS. 9 to 12 are diagrams that illustrate situations on the calculation of the display position of the operating information that is displayed on the display unit 208 by the display control unit 211d. FIGS. 13 to 15 are diagrams that schematically supplement the situations illustrated in FIGS. 9 to 11. In FIGS. 13 to 15, a joint positioned farther the wrist is denoted by "o", and a bone is denoted by a straight line. Although description will be presented based on the relation between the index finger and the thumb with reference to FIGS. 8 to 15, description that is based on the relation between the middle finger and the thumb or the relation between the ring finger and the index finger may be similar thereto.

As illustrated in FIG. 8, the display control unit 211d allows the display unit 208 to display a band part K1 as operating information in a display area. The band part K1 is located on a trajectory, along which the thumb F2 can be moved with the index finger F1 in touch with the touch panel 209 as its center, and is located on the display area in which the index finger F1 and the thumb F2 can maintain a predetermined distance therebetween. More specifically, as illustrated in FIGS. 8 and 9, the display control unit 211d allows the display unit 208 to display, as the operating information in a display area, the band part K1 that is located on an arc of a radius (distance $R_f$) that is determined by the trajectory along which the thumb F2 of the photographer can be moved with the index finger F1 set as its center.

Figure 9:
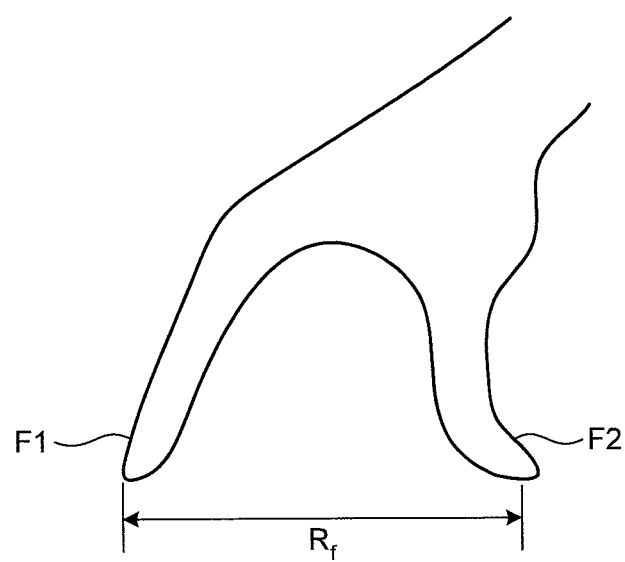
FIG. 9 is a diagram that illustrates a situation on the calculation of the display position of the operating information that is displayed on the display unit by the display control unit.
Figure 10:
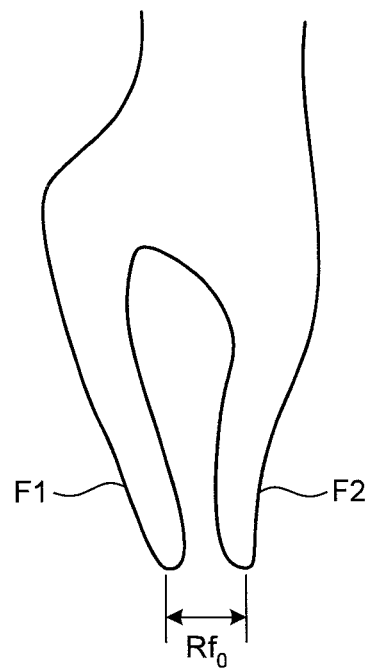
FIG. 10 is a diagram that illustrates a situation on the calculation of the display position of operating information that is displayed on the display unit by the display control unit.

As illustrated in FIGS. 9 and 10, in a case where the distance $R_f$ between the index finger F1 and the thumb F2 decreases to be a distance $Rf_0$, the touch position of the index finger F1 and the touch position of the thumb F2 are close to each other, and accordingly, it is difficult for the touch panel 209 to accurately detect the respective touch positions of the index finger F1 and the thumb F2. In addition, as illustrated in FIG. 10, in a case where the distance $R_f$ between the index finger F1 and the thumb F2 is short, an operation region acquired when the thumb F2 is moved by the photographer on the arc with the index finger F1 as the center is also decreased. In contrast to this, in a case where the distance $R_f$ between the index finger F1 and the thumb F2 gradually increases from the state illustrated in FIG. 9 so as to be out of the display area of the display unit 208, the touch panel 209 may not detect the touch positions of the index finger F1 and the thumb F2.

Figure 11:
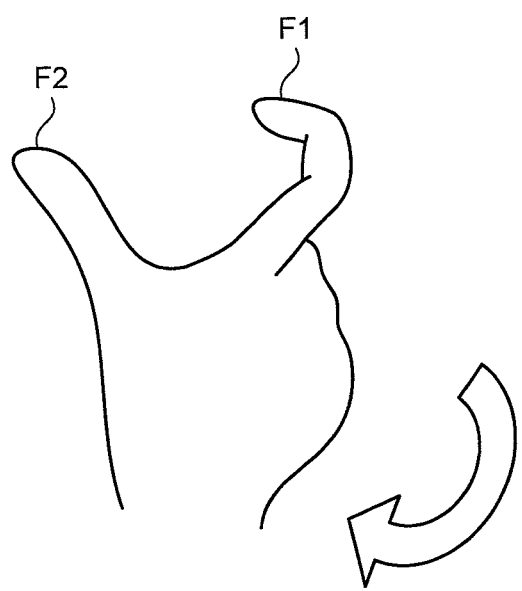
FIG. 11 is a diagram that illustrates a situation on the calculation of the display position of operating information that is displayed on the display unit by the display control unit.

As illustrated in FIG. 11, since a photographer can twist the wrist, various touch operations can be performed. However, in a case where capturing an image is performed, in order to prevent blur of a subject, the photographer needs to perform a touch operation while fixing the imaging apparatus 1 using the other hand (left hand). Accordingly, as illustrated in FIG. 13, it is easy and simple for the photographer to operate by using up to an indirect portion of the base of the thumb F2 with the index finger F1 set as the center.

In the state as illustrated in FIGS. 9 and 11, in order to secure the distance between the index finger F1 and the thumb F2, the photographer outstretches all the joints from the wrist toward the distal end of the thumb F2 (see FIG. 13). Accordingly, in a case where the photographer rotates the thumb F2 around the index finger F1 as the center, an operation of moving the wrist is performed.

Figure 12:
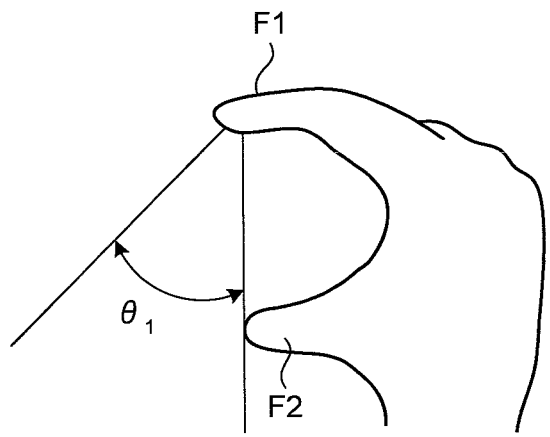
FIG. 12 is a diagram that illustrates a situation on the calculation of the display position of operating information that is displayed on the display unit by the display control unit.

In contrast to this, in a state illustrated in FIG. 12, the photographer can gently bend the joints of the index finger F1 and the thumb F2 (see FIG. 14). Accordingly, as illustrated in FIGS. 14 and 15, since there are margins in the joints of the index finger F1 and the thumb F2, the photographer can perform a sliding operation while touching with the thumb F2 with the index finger F1 set as the center without turning the wrist. More specifically, the distance $R_f$ between the index finger F1 and the thumb F2, for example, is about 3 cm, and an angle $\theta_1$ illustrated in FIG. 12 is about 45 degrees.

As above, the display control unit 211d displays the operating information on the display unit 208 in the display area of the display unit 208 that can be operated by the photographer not by performing a large movement by using the wrist as illustrated in FIG. 11 but by only moving the joints located farther the wrist or the joints of the fingers. The wrist may be slightly moved, and the same can be described for not only the relation between the index finger and the thumb but also two fingers of the same hand. More specifically, the display control unit 211d displays the operating information in a part of a ring-shaped area with the initial touch position, at which the touch panel 209 is touched with the index finger F1, as the center in the display area.

Figure 16:
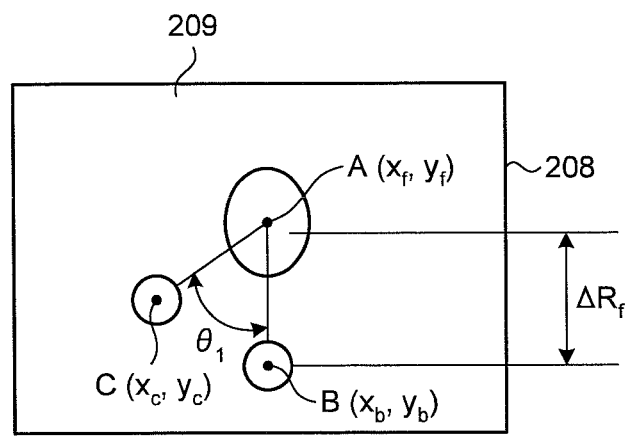
FIG. 16 is a diagram that illustrates an overview of a calculation method for calculating a display position when the display unit is allowed to display operating information by the display control unit.

FIG. 16 is a diagram that illustrates an overview of a calculation method for calculating a display position when the display control unit 211d allows the display unit 208 to display operating information. In FIG. 16, a coordinate system will be considered in which the lower left side of the display screen of the display unit 208 is set as the origin, the horizontal direction of the display unit 208 is set as the x axis and the vertical direction is set as the y axis.

As illustrated in FIG. 16, in a case where point A located at a position at which the index finger F1 of the photographer is in touch with the touch panel 209 is set as $(x_f, y_f)$, and the end portions of a display area in which the operating information is displayed are set as point B $(x_b, y_b)$ and point C $(x_c, y_c)$, the display control unit 211d calculates point B and point C by using the following equations.

$$x_b = x_f \quad (1)$$

$$y_b = y_f - (\Delta R_f)^{1/2} \quad (2)$$

$$x_c = x_f - (\Delta R_f)^{1/2} \quad (3)$$

$$y_c = y_f - (\Delta R_f)^{1/2} \quad (4)$$

As above, the display control unit 211d calculates display positions (point B and point C) in which the operating information is displayed with a point (point A), at which the index finger F1 of the photographer is in touch with the touch panel 209, set as a reference by using Equations (1) to (4).

Figure 17:
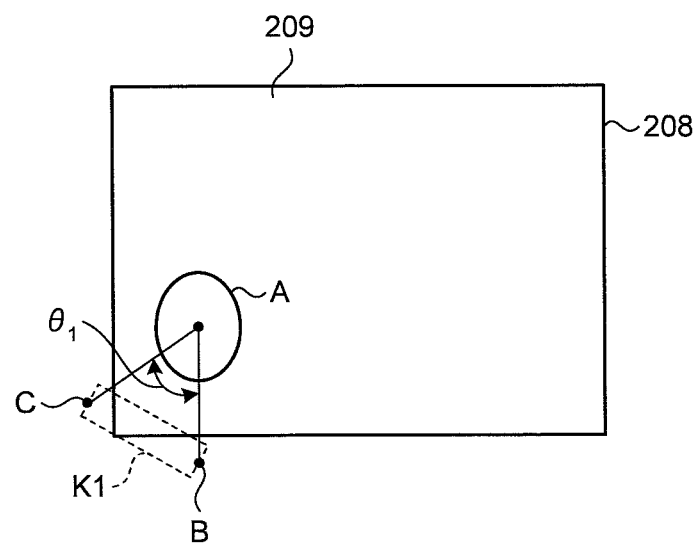
FIG. 17 is a diagram that illustrates an example in which an end portion of the display position of the operating information, which is calculated by the display control unit, protrudes from a display area of the display unit.

Referring back to FIG. 5, the description of Step S205 and the subsequent steps will be continued. In Step S205, the control unit 211 determines whether or not the display positions of the operating information that are calculated by the display control unit 211d can be displayed within the display area of the display unit 208. For example, as illustrated in FIG. 17, in a case where at least one of the end portions (point B and point C) of the display position of the operating information that are calculated by the display control unit 211d protrudes from the display area of the display unit 208, the control unit 211 determines that the operating information may not be displayed at the display position that is calculated by the display control unit 211d. In addition, in the situation illustrated in FIG. 17, since both point B and point C protrude from the display area of the display unit 208, the control unit 211 determines that the operating information may not be displayed at the display position that is calculated by the display control unit 211d. In a case where the control unit 211 determines that the operating information can be displayed at the display position calculated by the display control unit 211d (Yes in Step S205), the imaging apparatus 1 proceeds to Step S206 to be described later. On the other hand, in a case where the control unit 211 determines that the operating information may not be displayed at the display position calculated by the display control unit 211d (No in Step S205), the imaging apparatus 1 proceeds to Step S207 to be described later.

Figure 18:
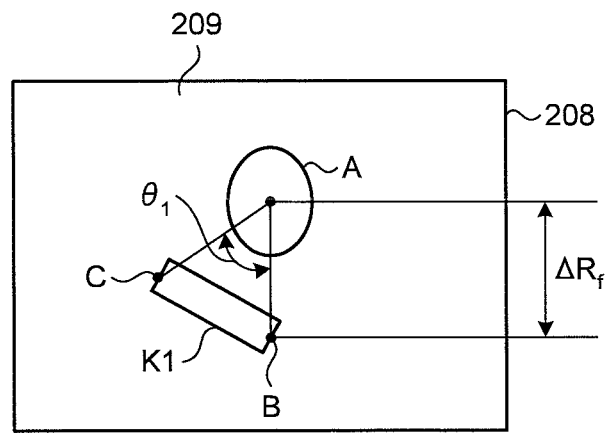
FIG. 18 is a diagram that illustrates an example of a band part as the operating information that is displayed on the display unit by the display control unit.

In Step S206, the display control unit 211d allows the display unit 208 to display the band part K1 on a straight line joining calculated points B and C. More specifically, as illustrated in FIG. 18, the display control unit 211d allows the display unit 208 to display the band part K1 on the straight line joining points B and C. Thereafter, the imaging apparatus 1 returns the process to the main routine illustrated in FIG. 4.

A case (No in Step S205) will be described in which the control unit 211 determines that the operating information may not be displayed at the display position calculated by the display control unit 211d in Step S205. In such a case, the display control unit 211d allows the display unit 208 to display the band part as the operating information at a predetermined position of the display area of the display unit 208 in Step S207.

Figure 19:
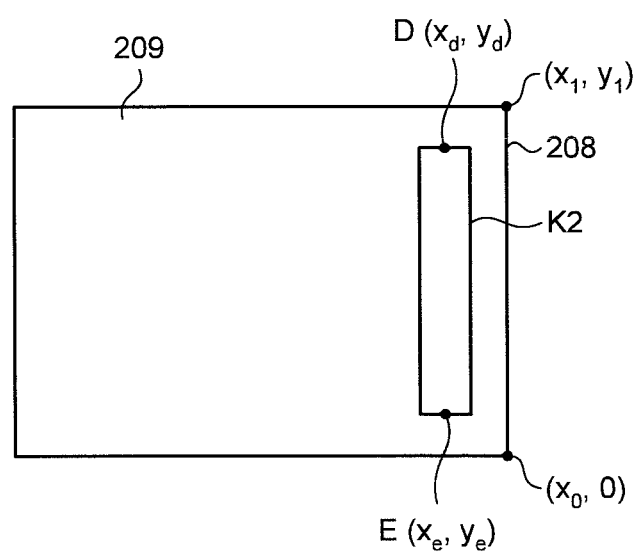
FIG. 19 is a diagram that illustrates an overview of another calculation method for calculating a display position when the display unit is allowed to display operating information by the display control unit.

FIG. 19 is a diagram that illustrates an overview of another calculation method for calculating a display position when the display control unit 211d allows the display unit 208 to display operating information. In FIG. 19, a coordinate system will be considered in which the lower left side of the display screen of the display unit 208 is set as the origin, the horizontal direction of the display unit 208 is set as the x axis, and the vertical direction is set as the y axis.

As illustrated in FIG. 19, in a case where point D located at an upper right position of the screen of the display unit 208 is set as $(x_1, y_1)$, and the coordinates of the lower right position of the screen of the display unit 208 is set as $(x_0, 0)$, when the end portions of the display area in which the operating information is displayed are point D $(x_d, y_d)$ and point E $(x_e, y_e)$, the display control unit 211d calculates point D and point E by using the following equations.

$$x_d = 0.9 \times x_1 \quad (5)$$

$$y_d = 0.9 \times y_1 \quad (6)$$

$$x_e = 0.9 \times x_1 \quad (7)$$

$$y_e = 0.1 \times y_1 \quad (8)$$

As above, the display control unit 211d calculates the display positions (point D and point E) in which the operating information is displayed by using Equations (5) to (8) and allows the display unit 208 to display a band part K2 on a straight line joining calculated points D and E. Thereafter, the imaging apparatus 1 returns the process to the main routine illustrated in FIG. 4.

A case (Yes in Step S202) will be described in which the control unit 211 determines that the display unit 208 displays the operating information in Step S202. In such a case, the touch state determining unit 211c determines whether or not an almost same position on the touch panel 209 has been continuously touched by the photographer in Step S208. In a case where the touch state determining unit 211c determines that the almost same position on the touch panel 209 has been continuously touched by the photographer (Yes in Step S208), the imaging apparatus 1 proceeds to Step S209 to be described later. On the other hand, in a case where the touch state determining unit 211c determines that an almost same position on the touch panel 209 has not been continuously touched by the photographer (No in Step S208), the imaging apparatus 1 proceeds to Step S211 to be described later.

Figure 20:
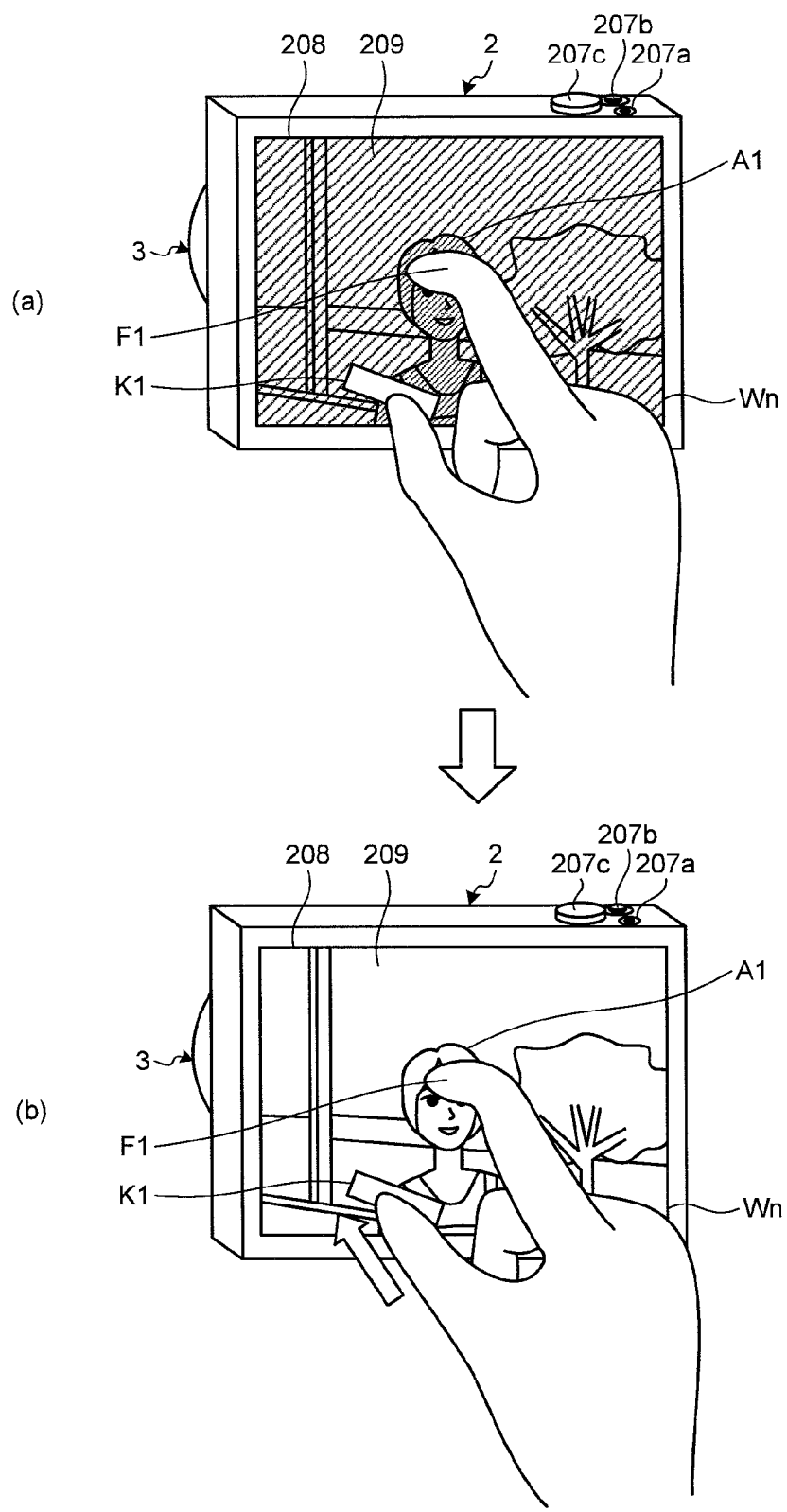
FIG. 20 is a diagram that illustrates an example of an image that is displayed by the display unit.

In Step S209, the touch state determining unit 211c determines whether or not the band part K1 on the live view image Wn that is displayed by the display unit 208 has been touched by the photographer. In a case where the touch state determining unit 211c determines that the band part K1 on the live view image Wn that is displayed by the display unit 208 has been touched by the photographer (Yes in Step S209), the capturing control unit 211e corrects the exposure of an image captured by the imaging apparatus 1 in accordance with the touch position at which the band part K1 is touched by the photographer in Step S210. More specifically, as illustrated in FIG. 20, as the photographer drives the diaphragm driving unit 304 in accordance with the touch position at which the band part K1 is touched by the photographer, the capturing control unit 211e adjusts the exposure value of the live view image. In the situation that is illustrated in FIG. 20(a), since the live view image Wn that is displayed by the display unit 208 is dark, the photographer adjusts the exposure value to the positive side by touching the band part K1 (FIG. 20(b)). Thereafter, the imaging apparatus 1 returns the process to the main routine illustrated in FIG. 4.

In Step S209, in a case where the touch state determining unit 211c determines that the band part K1 on the live view image Wn displayed by the display unit 208 has not been touched by the photographer (No in Step S209), the imaging apparatus 1 returns the process to the main routine that is illustrated in FIG. 4.

In Step S208, a case will be described in which the touch state determining unit 211c determines that an almost same position on the touch panel 209 has not been continuously touched by the photographer (No in Step S208). In such a case, the control unit 211 determines whether or not a predetermined time (five seconds) has elapsed after the band part K1 as the operating information is displayed by the display unit 208 in Step S211. In a case where the control unit 211 determines that the predetermined time has elapsed after the display unit 208 displays the band part K1 as the operating information (Yes in Step S211), the display control unit 211d removes the band part K1 as the operating information on the live view image Wn that is displayed by the display unit 208 in Step S212. Thereafter, the imaging apparatus 1 returns the process to the main routine that is illustrated in FIG. 4. On the other hand, in a case where the control unit 211 determines that the predetermined time has not elapsed after the display unit 208 displays the band part K1 as the operating information (No in Step S211), the imaging apparatus 1 returns the process to the main routine that is illustrated in FIG. 4.

According to the above-described first embodiment of the present invention, in a case where the touch state determining unit 211c determines that one finger of a photographer maintains a touch state at an almost same position based on a position signal that is input from the touch panel 209, the display control unit 211d allows the display unit 208 to display selectable operating information relating to the capturing operation of the imaging apparatus 1 in a display area located on the periphery of the touch position, and, in a case where a touch has been detected by the capturing control unit 211e on the display area of the operating information that is displayed by the display unit 208, the capturing operation of the imaging apparatus 1 is controlled in accordance with the operating information corresponding to the detected touch position. As a result, the photographer can input a desired capturing operation through an intuitive operation.

In addition, according to the first embodiment of the present invention, a change in the image can be checked in real time by a photographer performing a sliding operation in an analog manner for the band part K1 as the operating information that is displayed by the display unit 208.

In the first embodiment of the present invention, the display control unit 211d allows the display unit 208 to display the operating information in a band shape on the display unit 208. Alternatively, the operating information may be displayed, for example, in an arc shape having a predetermined width by the display unit 208.

In the first embodiment of the present invention, a case has been described in which an exposure value as the operating information is adjusted. Alternatively, it can be applied to various capturing operations relating to contrast, a gray scale, chroma, a shutter speed, capturing sensitivity, for example. In such a case, for example, the display control unit 211d may sequentially change the content of the capturing operation based on the number of touches of the photographers' thumb F2 on the touch panel 209. More specifically, the display control unit 211d may allow the display unit 208 to display contrast, a gray scale, chroma, a shutter speed, capturing sensitivity, and an exposure value in the mentioned order.

In the first embodiment of the present invention, the touch panel operation determining and parameter changing process is performed in the shooting mode of the imaging apparatus 1. Alternatively, it may be applied to the playback mode in which captured image data is played back by the display unit 208.

In the first embodiment of the present invention, by using the initial touch point (initial touch position) and the auxiliary touch point (auxiliary touch position), a target portion is specified, and the image representation (image adjustment) of the portion is changed. Here, the image can be any image other than a captured image. Since a portion of user's interest is designated at the time of the initial touch, an application may be performed in which the adjustment of exposure, contrast, a color balance, and the like is automatically performed so as to improve the appearance of the portion at that time point, and the adjustment result is modified through an auxiliary touch point changing operation (sliding operation). In other words, automatic adjustment is performed simultaneously with a designated touch (initial touch), and manual adjustment, which is performed for changing the result, is performed through an auxiliary touch or sliding. This similarly applies to the other embodiments.

In the first embodiment of the present invention, the word the "initial touch position" is used, but the position is not necessarily be the position actually touched for the first time. Mode setting may be performed in which an initial touch is accepted.

Second Embodiment

Next, a second embodiment of the present invention will be described. In an imaging apparatus according to the second embodiment of the present invention, the configuration of a control unit is different from that of the above-described imaging apparatus. In addition, the content of a touch panel operation determining and parameter changing process performed by the imaging apparatus according to the second embodiment of the present invention is different from that performed by the above-described imaging apparatus. Thus, hereinafter, the configuration that is different from that of the above-described first embodiment will be described, and then, the content of the touch panel operation determining and parameter changing process performed by the imaging apparatus according to the second embodiment of the present invention will be described. In the drawings, the same reference numeral is assigned to the same part.

Figure 21:
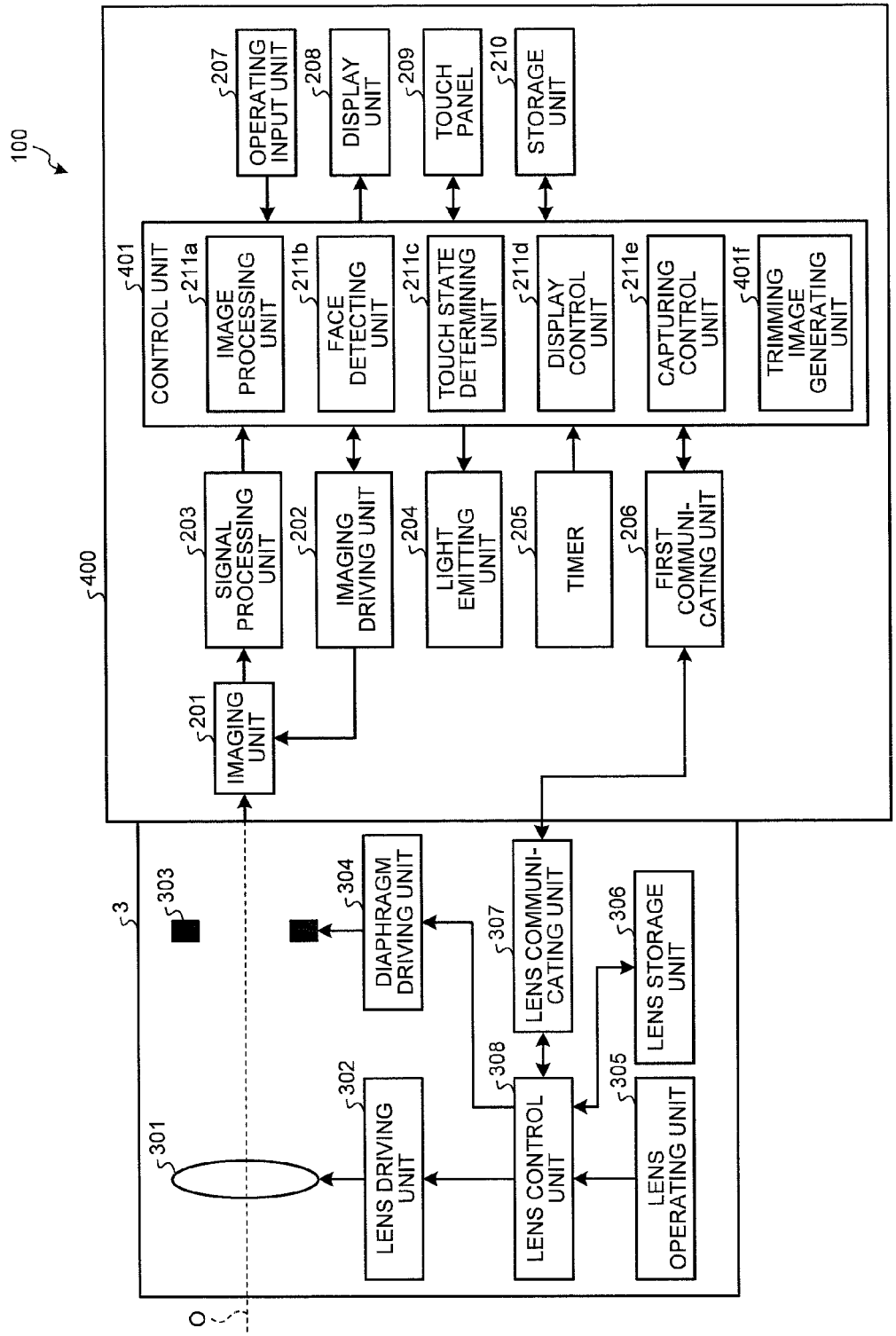
FIG. 21 is a block diagram that illustrates the configuration of an imaging apparatus according to a second embodiment of the invention.

FIG. 21 is a block diagram that illustrates the configuration of an imaging apparatus 100 according to the second embodiment of the present invention. As illustrated in FIG. 21, the imaging apparatus 100 includes a main body unit 400 and a lens unit 3.

The main body unit 400 includes an imaging unit 201, an imaging driving unit 202, a signal processing unit 203, a light emitting unit 204, a timer 205, a first communicating unit 206, an operating input unit 207, a display unit 208, a touch panel 209, a storage unit 210, and a control unit 401.

The control unit 401 includes an image processing unit 211a, a face detecting unit 211b, a touch state determining unit 211c, a display control unit 211d, a capturing control unit 211e, and a trimming image generating unit 401f.

The trimming image generating unit 401f cuts out an area that includes a touch position touched by the photographer so as to generate a trimming image based on a position signal that is input from the touch panel 209. More specifically, the trimming image generating unit 401f generates a trimming image that includes a touch position, which is touched by a photographer, on a live view image displayed by the display unit 208 and is acquired by being cut out, for example, in a predetermined size, for example, a size having a 1/16 area of the display area of the display unit 208. Here, the size of the trimming image can be appropriately set.

Figure 22:
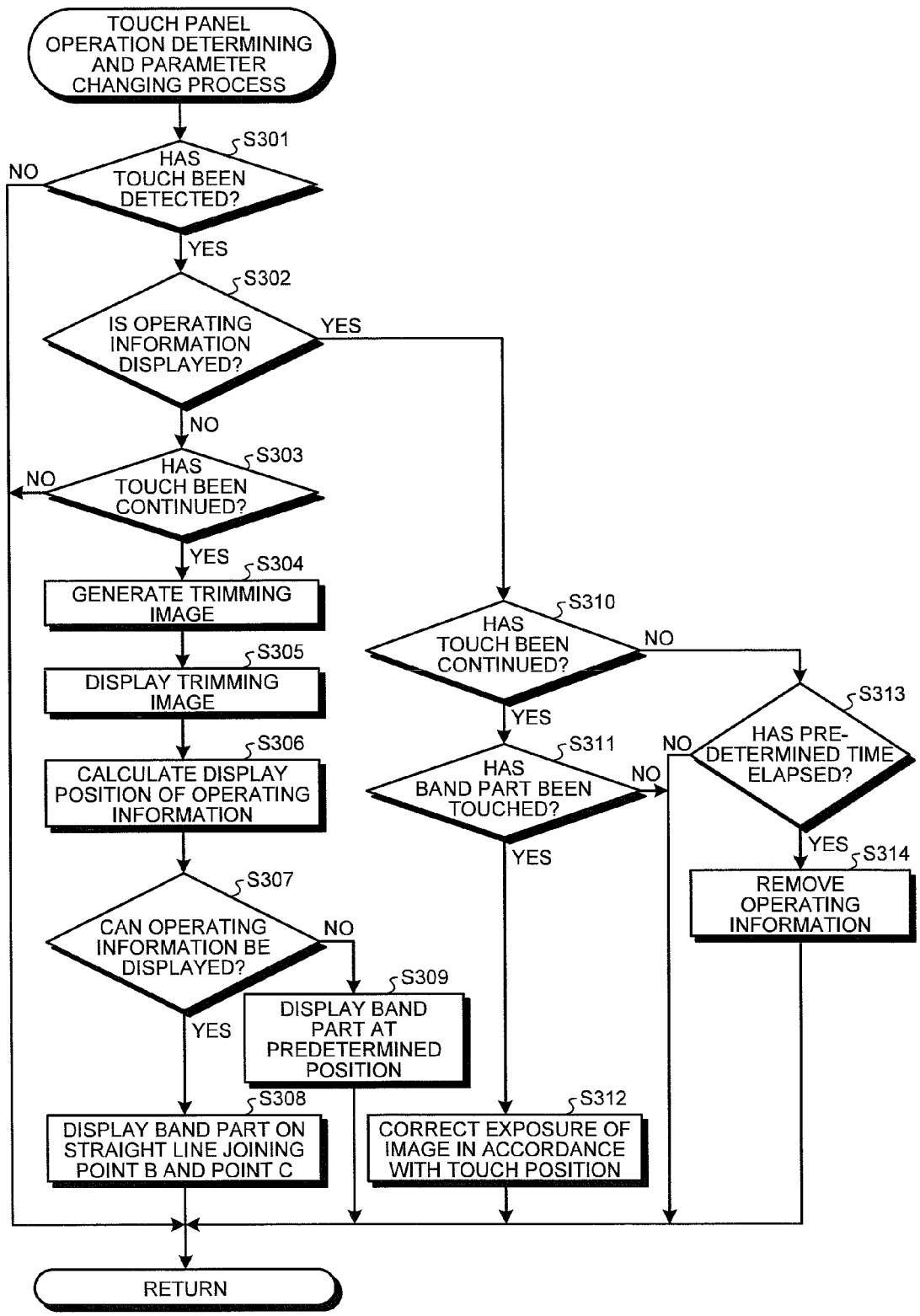
FIG. 22 is a flowchart that illustrates an overview of a touch panel operation determining and parameter changing process that is performed by the imaging apparatus according to the second embodiment of the invention.

Next, the touch panel operation determining and parameter changing process performed by the imaging apparatus 100 according to the second embodiment in Step S103 illustrated in FIG. 4 will be described. FIG. 22 is a flowchart that illustrates an overview of the touch panel operation determining and parameter changing process.

In FIG. 22, Steps S301 to S303 correspond to Steps S201 to S203 described above.

In Step S304, the trimming image generating unit 401f generates a trimming image by cutting out an area including the touch position touched by the photographer from the live view image based on a position signal that is input from the touch panel 209.

Figure 23:
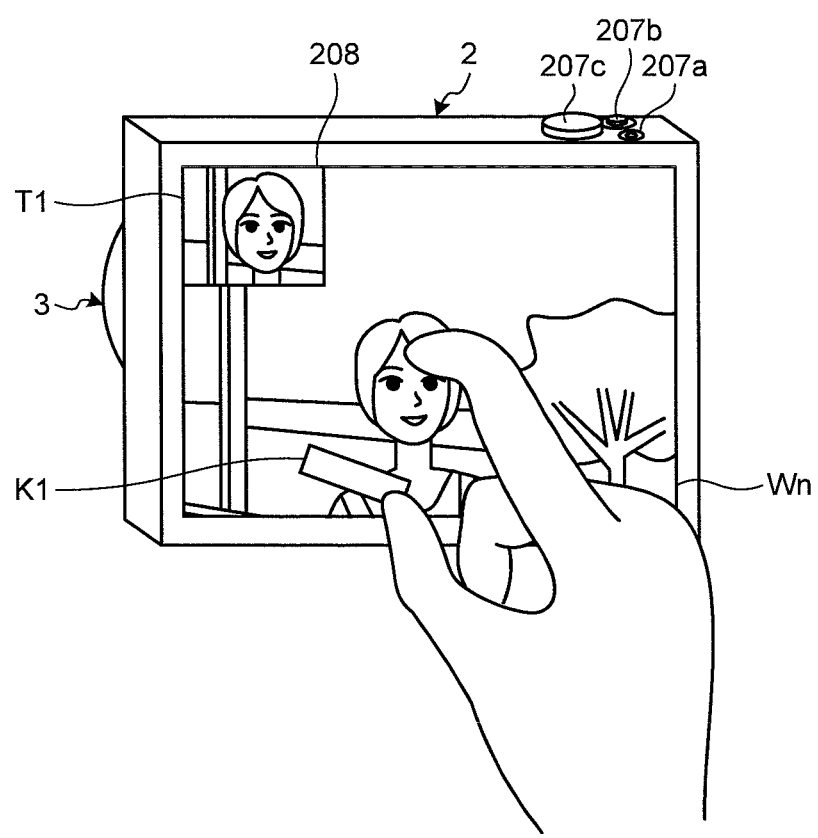
FIG. 23 is a diagram that illustrates an example of an image that is displayed by the display unit.

Subsequently, the display control unit 211d allows the display unit 208 to display the trimming image generated by the trimming image generating unit 401f at a predetermined position on the live view image Wn that is displayed by the display unit 208 in Step S305. More specifically, as illustrated in FIG. 23, the display control unit 211d allows the display unit 208 to display the trimming image T1 at a predetermined position on the live view image Wn that is displayed by the display unit 208, for example, an upper left side of the screen. Accordingly, the photographer can check the trimming image T1 by touching a desired subject through the touch panel 209 even in a case where the subject is hidden by the fingers. After Step S305, the imaging apparatus 1 proceeds to Step S306.

Steps S306 to S314 correspond to Steps S205 to S212.

According to the above-described second embodiment of the present invention, the trimming image generating unit 401f generates a trimming image by cutting out an area including a touch position touched by the photographer from the live view image Wn based on a position signal that is input from the touch panel 209, and the display control unit 211d allows the display unit 208 to display the trimming image T1 at a predetermined position on the live view image Wn that is displayed by the display unit 208. Accordingly, even in a case where a desired subject is hidden by the fingers, a photographer can input a desired capturing operation through an intuitive operation while checking it by using the trimming image T1. Therefore, regardless of a designated position, a limited panel can be effectively used, and the panel can be used for an operation with a high degree of freedom, whereby the user's operability can be improved.

Third Embodiment

Next, a third embodiment of the present invention will be described. The third embodiment of the present invention has the same configuration as that of the above-described second embodiment, and only a touch panel operation determining and parameter changing process performed by an imaging apparatus is different from that of the second embodiment. Thus, hereinafter, the touch panel operation determining and parameter changing process performed by the imaging apparatus according to the third embodiment of the present invention will be described. In the drawings, the same reference numeral is assigned to the same part.

Figure 24A:
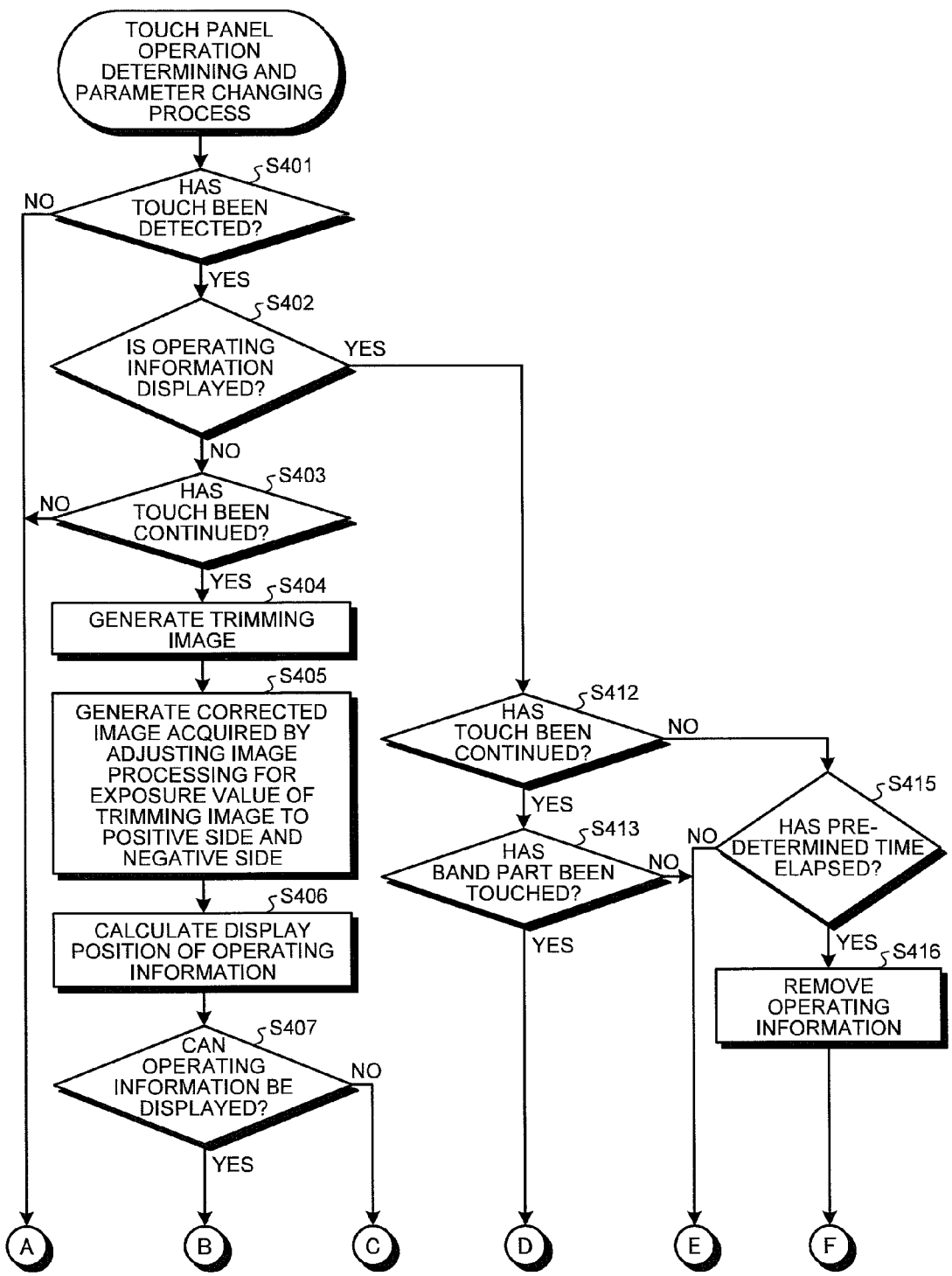
FIGS. 24A and 24B are flowcharts that illustrate an overview of a touch panel operation determining and parameter changing process that is performed by an imaging apparatus according to a third embodiment of the invention.
Figure 24B:
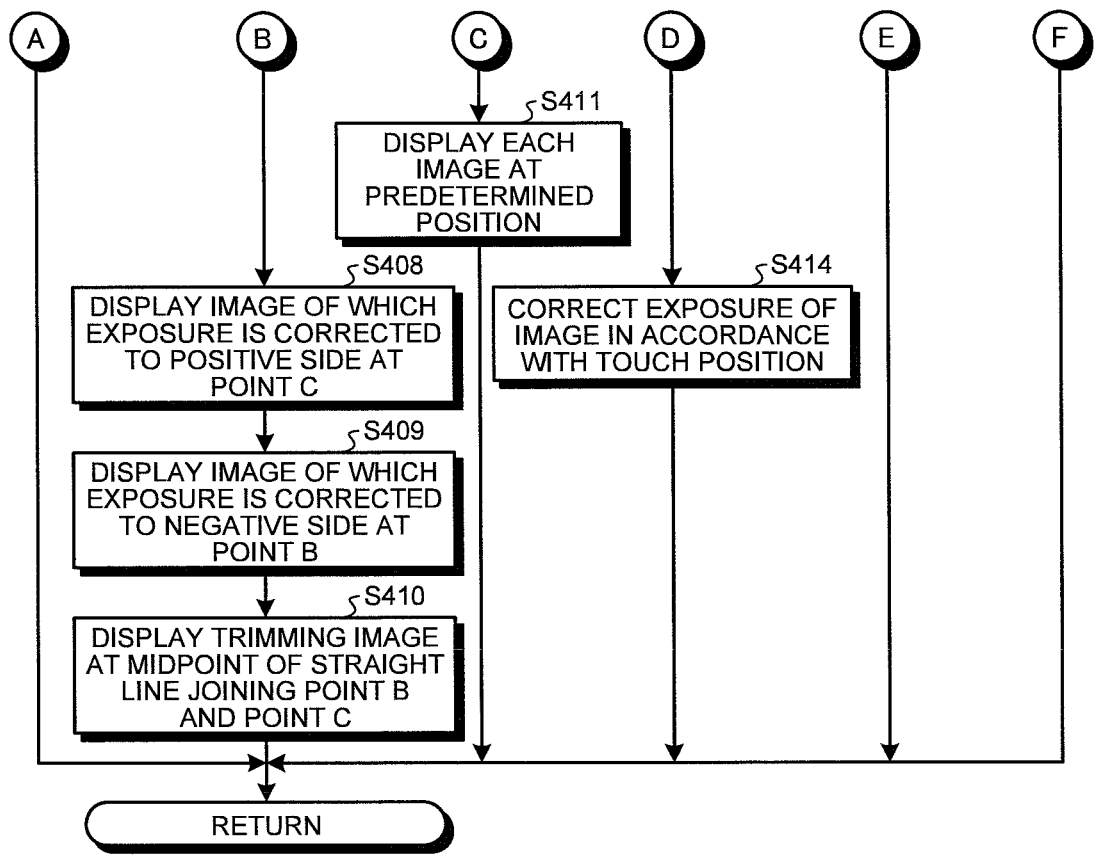

FIGS. 24A and 24B are flowcharts that illustrate an overview of the touch panel operation determining and parameter changing process that is performed by the imaging apparatus 100 according to the third embodiment.

In FIGS. 24A and 24B, Steps S401 to S404 correspond to Steps S301 to S304 described above.

In Step S405, the image processing unit 211a generates corrected images acquired by performing image processing, in which an exposure value of a trimming image generated by the trimming image generating unit 401f as an operating information image is adjusted to the positive side and the negative side.

Steps S406 to S407 correspond to Steps S204 to S205.

Figure 25:
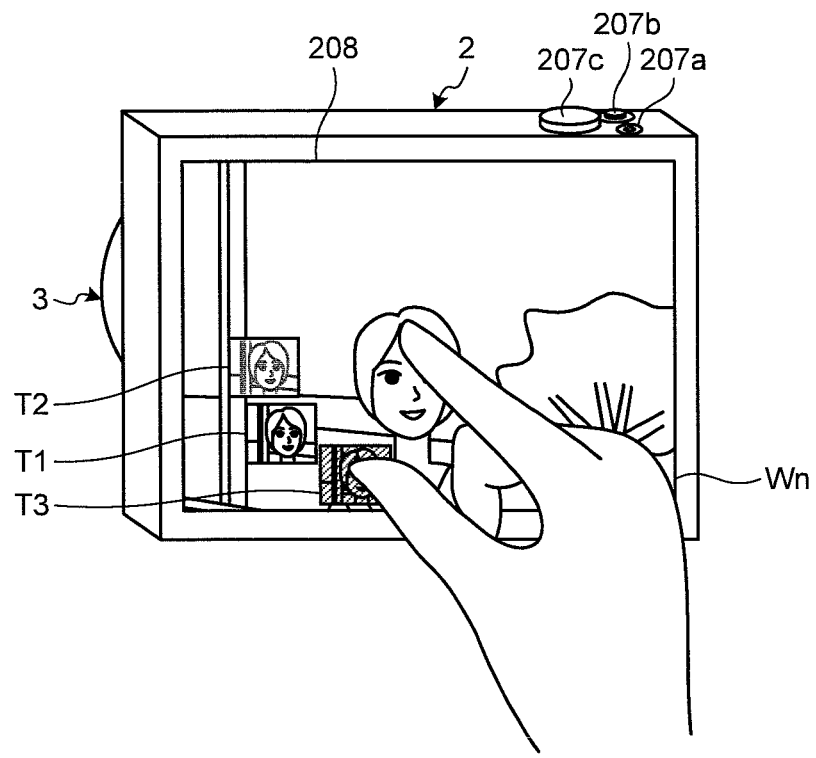
FIG. 25 is a diagram that illustrates an example of an image that is displayed by the display unit.

In Step S408, the display control unit 211d displays a positive-side exposure-corrected image for which the image processing unit 211a performs exposure correction to the positive side at point C, displays a negative-side exposure-corrected image for which the image processing unit 211a performs exposure correction to the negative side at point B in Step S409, and displays the trimming image that is generated by the trimming image generating unit 401f at a midpoint on a straight line joining point B and point C in Step S410. More specifically, as illustrated in FIG. 25, the display control unit 211d displays the positive-side exposure-corrected image T2 at point C, the negative-side exposure-corrected image T3 at point B, and the trimming image T1 at a midpoint on the straight line joining point C and point B on a live view image Wn. Accordingly, a photographer can intuitively perceive an image that has a different exposure value, and the exposure value can be easily adjusted by touching a desired image of which the exposure value has been adjusted. After Step S410, the imaging apparatus 100 returns the process to the main routine illustrated in FIG. 4. The touched screen may be displayed in an enlarged scale for an easy checking process.

Figure 26:
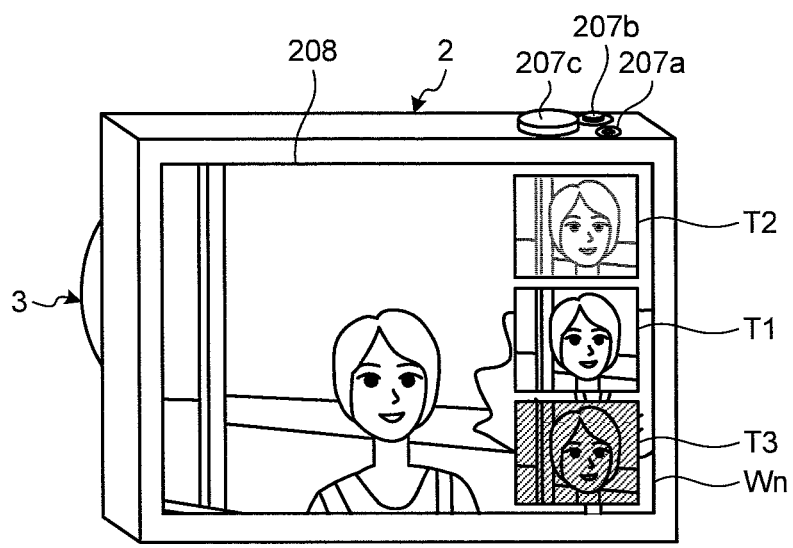
FIG. 26 is a diagram that illustrates an example of an image that is displayed by the display unit.

In Step S411, the display control unit 211d allows the display unit 208 to display images having mutually different exposure values as the operating information at predetermined positions on the display area of the display unit 208. More specifically, as illustrated in FIG. 26, the display control unit 211d allows the display unit 208 to display images having mutually different exposure values as the operating information at predetermined positions on the display area of the display unit 208. After Step S411, the imaging apparatus 100 returns the process to the main routine that is illustrated in FIG. 4.

Steps S412 to S416 correspond to Steps S310 to S314.

According to the above-described third embodiment of the present invention, the display control unit 211d allows the display unit 208 to display the positive-side exposure-corrected image and the negative-side exposure-corrected image, which are generated by the image processing unit 211a, and the trimming image as operating information. As a result, an exposure value can be easily adjusted by a photographer touching a desired image of which the exposure value is adjusted while intuitively perceiving images having mutually different exposure values.

In the third embodiment of the present invention, a case has been described in which the display control unit 211d displays exposure value-corrected images of which the exposure values as the operating information are adjusted. Alternatively, various images of which the contrast, the gray scale, the chroma, the capturing sensitivity, and the like are adjusted can be displayed. Furthermore, the display control unit 211d may allow the display unit 208 to display a special-effect image for which a special effect process (art filter) acquired by combining a plurality of image processes using the image processing unit 211a, for example, at least a soft focusing process or a shading process is performed as operating information.

Fourth Embodiment

Next, a fourth embodiment of the present invention will be described. The fourth embodiment of the present invention has the same configuration as that of the above-described second embodiment, and only a touch panel operation determining and parameter changing process performed by an imaging apparatus is different from that of the second embodiment. Thus, hereinafter, the touch panel operation determining and parameter changing process performed by the imaging apparatus according to the fourth embodiment of the present invention will be described. In the drawings, the same reference numeral is assigned to the same part.

Figure 27A:
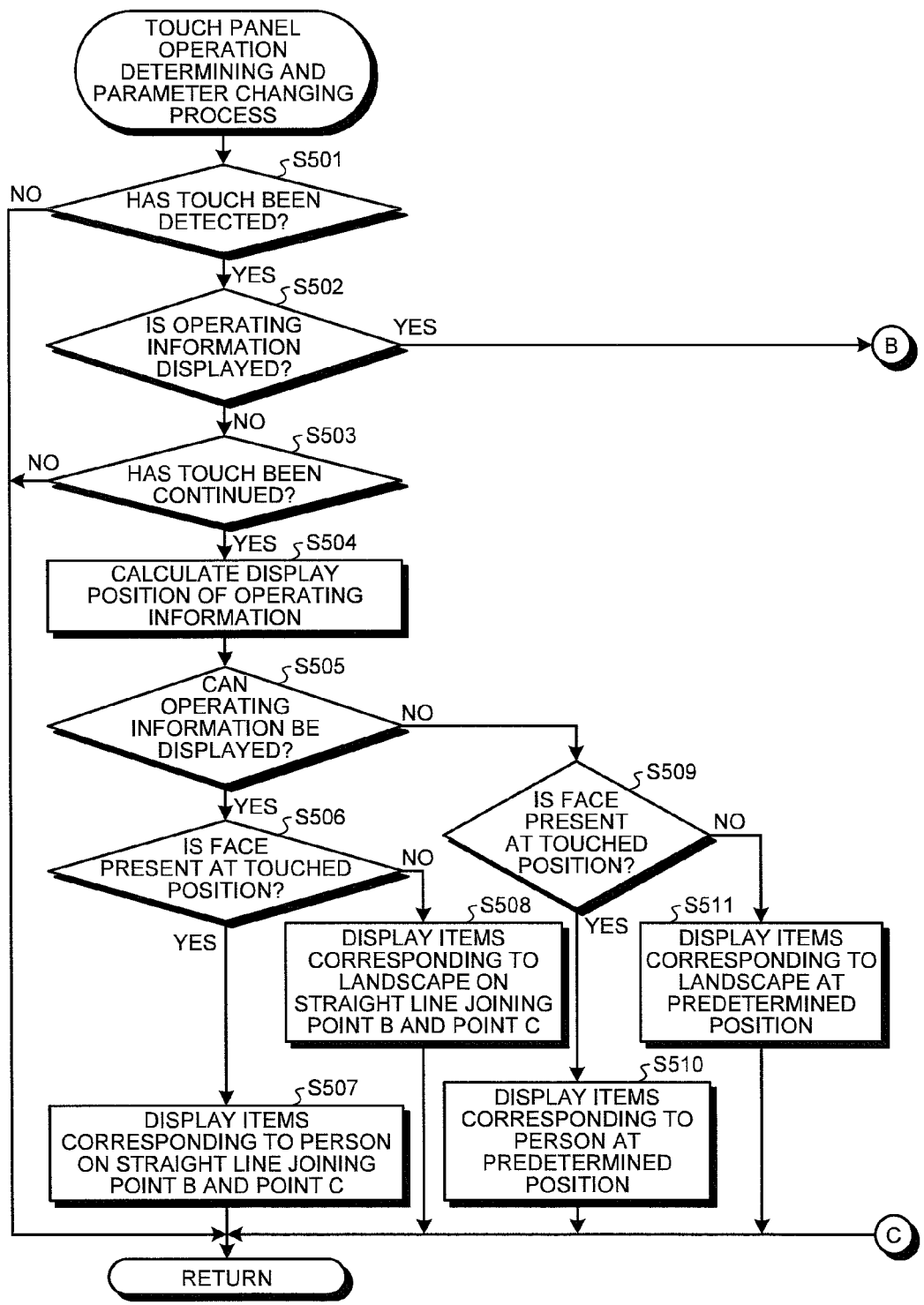
FIGS. 27A and 27B are flowcharts that illustrate an overview of a touch panel operation determining and parameter changing process that is performed by an imaging apparatus according to a fourth embodiment of the invention.
Figure 27B:
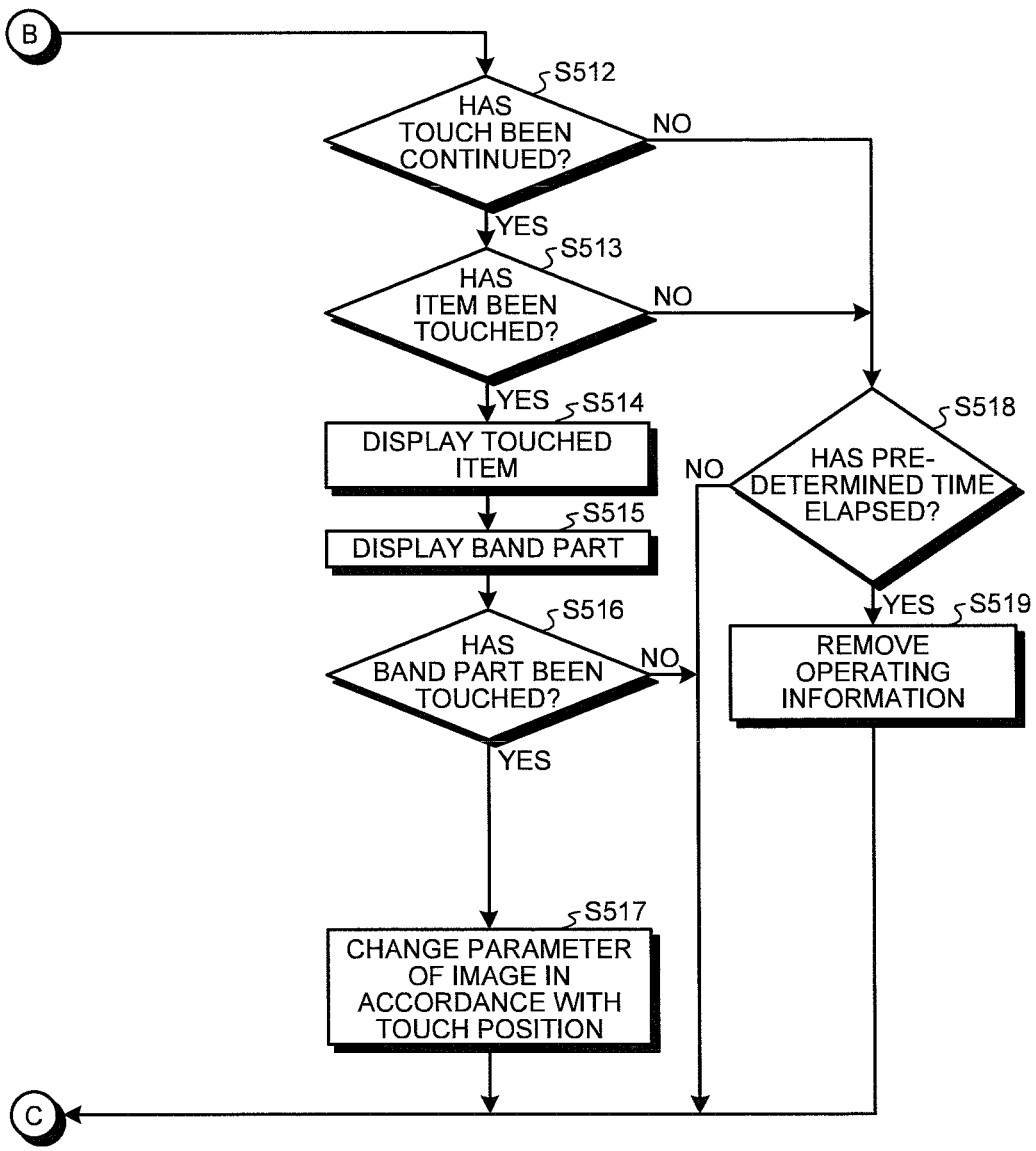

FIGS. 27A and 27B are flowcharts that illustrate an overview of the touch panel operation determining and parameter changing process that is performed by the imaging apparatus 100 according to the fourth embodiment.

In FIGS. 27A and 27B, Steps S501 to S505 correspond to Steps S201 to S205 described above.

In Step S506, the control unit 401 determines whether or not a face is present at a touch position, which is touched by a photographer, for a live view image that is displayed by the display unit 208. More specifically, the control unit 401 determines whether or not the display position of a face that is detected from the live view image by the face detecting unit 211b and a position signal that is input from the touch panel 209 approximately coincide with each other. In a case where the control unit 401 determines that a face is present at the touch position touched by the photographer (Yes in Step S506), the imaging apparatus 1 proceeds to Step S507 to be described later. On the other hand, in a case where the control unit 401 determines that a face is not present at the touch position touched by the photographer (No in Step S506), the imaging apparatus 1 proceeds to Step S508 to be described later.

Figure 28:
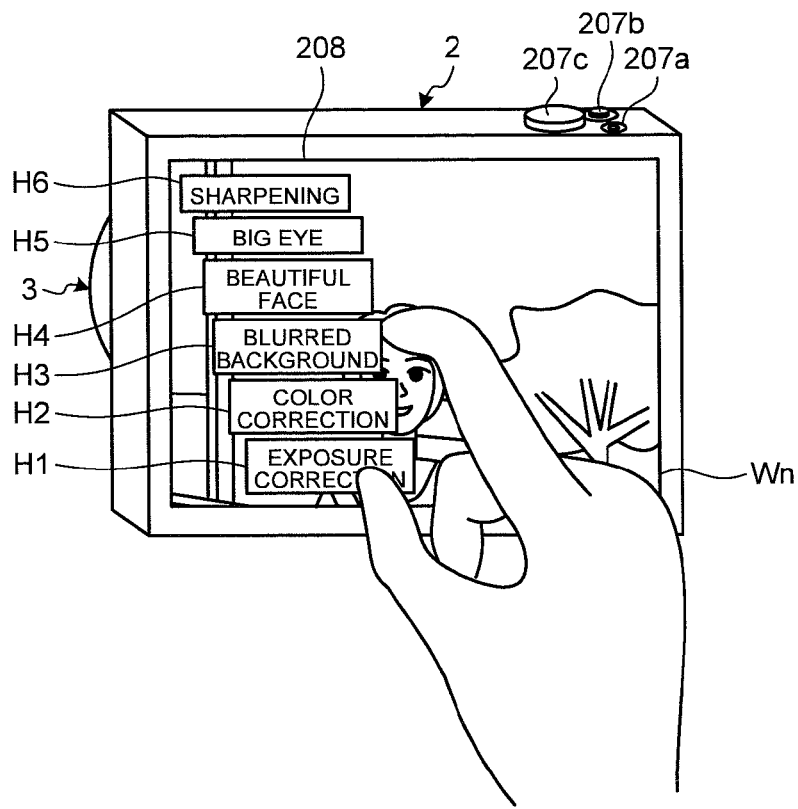
FIG. 28 is a diagram that illustrates an example of an image that is displayed by the display unit.

In Step S507, the display control unit 211d allows the display unit 208 to display items of operating information corresponding to a person on a straight line joining point B and point C. More specifically, as illustrated in FIG. 28, the display control unit 211d allows the display unit 208 to display an exposure correcting icon H1, a color correcting icon H2, a blurred background icon H3, a beautiful face icon H4, a big eye icon H5, and a sharpening icon H6 as operating information. The exposure correcting icon H1 is an icon that is used for accepting the adjustment of the exposure value of the image.

The color correcting icon H2 is an icon that accepts the adjustment of color correction of an image. The blurred background icon H3 is an icon that accepts the blur adjustment of the background by focusing on a subject touched by the photographer. The beautiful face icon H4 is an icon that accepts fine adjustment of the skin by smoothing fine contrast of a skin-color portion of a subject. The big eye icon H5 is an icon that accepts the adjustment of the size of eyes of a subject that is touched by the photographer. The sharpening icon H6 is an icon that accepts the adjustment of enhancement of the contour of each part of a subject touched by the photographer. After Step S507, the imaging apparatus 100 returns the process to the main routine that is illustrated in FIG. 4.

Figure 29:
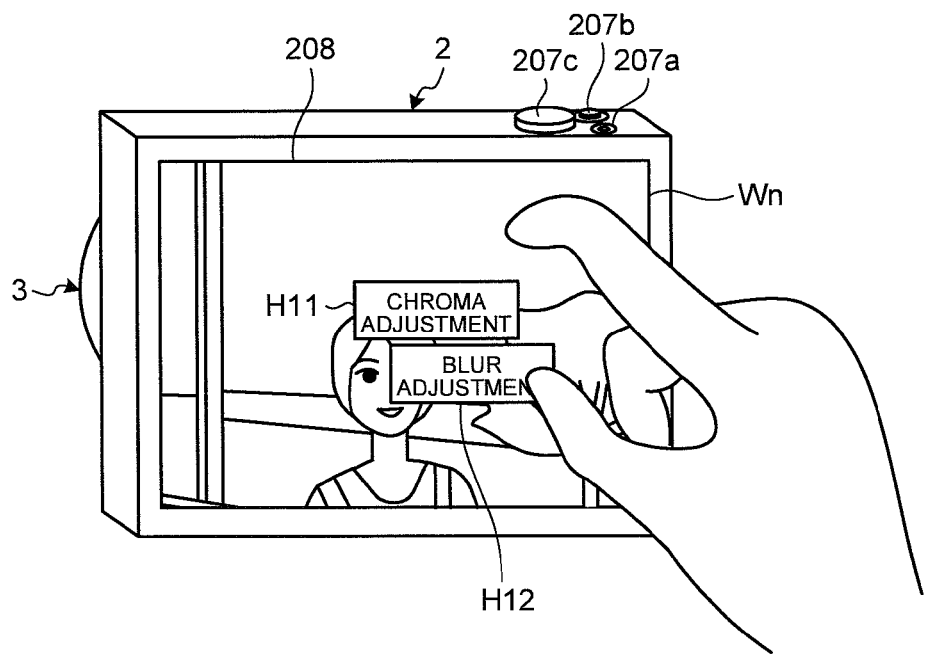
FIG. 29 is a diagram that illustrates an example of an image that is displayed by the display unit.

In Step S508, the display control unit 211d allows the display unit 208 to display items of operating information that correspond to a landscape on the straight line joining point B and point C. More specifically, as illustrated in FIG. 29, the display control unit 211d allows the display unit 208 to display a chroma adjusting icon H11 and a blur adjusting icon H12 as operating information.

The chroma adjusting icon H11 is an icon that accepts the adjustment of the chroma of an image. The blur adjusting icon H12 is an icon that accepts the adjustment of the blur of an image. After Step S508, the imaging apparatus 100 returns the process to the main routine that is illustrated in FIG. 4.

In Step S509, the control unit 401 determines whether or not a face is present at a touch position, which is touched by a photographer, for a live view image that is displayed by the display unit 208. In a case where the control unit 401 determines that a face is present at the touch position touched by the photographer (Yes in Step S509), the imaging apparatus 100 proceeds to Step S510 to be described later. On the other hand, in a case where the control unit 401 determines that a face is not present at the touch position touched by the photographer (No in Step S509), the imaging apparatus 100 proceeds to Step S511 to be described later.

In Step S510, the display control unit 211d allows the display unit 208 to display items (see FIG. 28) of operating information corresponding to a person at predetermined positions of the display unit 208. Thereafter, the imaging apparatus 100 returns the process to the main routine that is illustrated in FIG. 4.

In Step S511, the display control unit 211d allows the display unit 208 to display items (see FIG. 29) of operating information corresponding to a landscape at predetermined positions of the display unit 208. Thereafter, the imaging apparatus 100 returns the process to the main routine that is illustrated in FIG. 4.

In Step S512, the touch state determining unit 211c determines whether or not an almost same position on the touch panel 209 is continuously touched by the photographer. In a case where the touch state determining unit 211c determines that almost the same position on the touch panel 209 is continuously touched by the photographer (Yes in Step S512), the imaging apparatus 1 proceeds to Step S513 to be described later. On the other hand, in a case where the touch state determining unit 211c determines that almost a same position on the touch panel 209 is not continuously touched by the photographer (No in Step S512), the imaging apparatus 1 proceeds to Step S518 to be described later.

In Step S513, the touch state determining unit 211c determines whether or not an item of the operating information on the live view image that is displayed by the display unit 208 has been touched by the photographer. For example, the touch state determining unit 211c determines whether or not one of the icons H1 to H6 (see FIG. 28) of the operating information on the live view image Wn that is displayed by the display unit 208 has been touched. In a case where the touch state determining unit 211c determines that the photographer has touched an item of the operating information (Yes in Step S513), the imaging apparatus 100 proceeds to Step S514 to be described later. On the other hand, in a case where the touch state determining unit 211c determines that an item of the operating information has not been touched by the photographer within a predetermined time (for example, three seconds) (No in Step S513), the imaging apparatus 1 proceeds to Step S518 to be described later.

Figure 30:
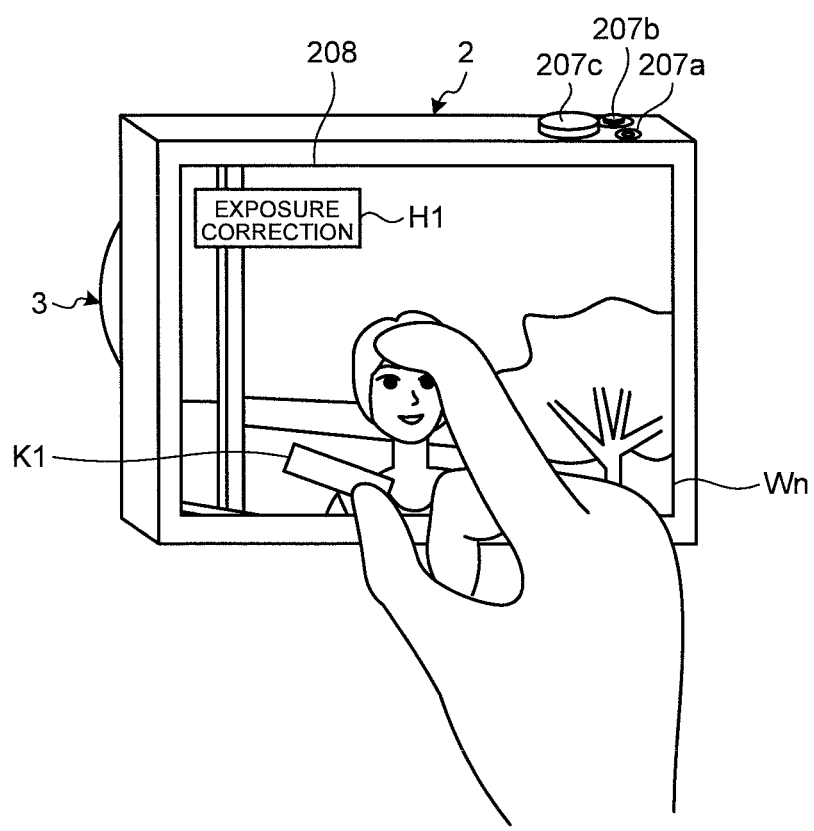
FIG. 30 is a diagram that illustrates an example of an image that is displayed by the display unit.

In Step S514, the display control unit 211d allows the display unit 208 to display the item touched by the photographer in an enlarged scale and allows the display unit 208 to display a band part corresponding to the touched item on the straight line joining point B and point C in Step S515. More specifically, as illustrated in FIG. 30, in a case where the exposure correcting icon H1 has been touched by the photographer, the display control unit 211d displays the exposure correcting icon H1 on the upper left side of the live view image Wn in an enlarged scale and allows the display unit 208 to display the band part K1 corresponding to the exposure correcting icon H1.

Subsequently, the touch state determining unit 211c determines whether or not the photographer has touched the band part K1 on the live view image Wn that is displayed by the display unit 208 in Step S516. In a case where the touch state determining unit 211c determines that the photographer has touched the band part K1 of the live view image Wn that is displayed by the display unit 208 (Yes in Step S516), the capturing control unit 211e changes the parameter of the image captured by the imaging apparatus 100 in accordance with the touch position at which the photographer has touched the band part K1 in Step S517. Thereafter, the imaging apparatus 100 returns the process to the main routine that is illustrated in FIG. 4.

In Step S516, in a case where the touch state determining unit 211c determines that the photographer has not touched the band part K1 on the live view image Wn that is displayed by the display unit 208 (No in Step S516), the imaging apparatus 100 returns the process to the main routine that is illustrated in FIG. 4.

Steps S518 to S519 correspond to Steps S211 to S212 described above.

According to the above-described fourth embodiment of the present invention, based on a position signal that is input from the touch panel 209, the display control unit 211d allows the display unit 208 to display items of the operating information corresponding to a person in a case where a face detected by the face detecting unit 211b is included at a touch position touched by the photographer, and allows the display unit 208 to display items of the operating information corresponding to a landscape in a case where the face detected by the face detecting unit 211b is not included at the touch position touched by the photographer. Accordingly, the photographer can perform an appropriate capturing operation for a desired subject.

Other Embodiments

In the above-described embodiments, as the imaging apparatus, a digital camera has been described. Alternatively, for example, a digital single lens reflex camera, a digital video camera, or an electronic apparatus such as a cellular phone or a tablet-type mobile device that has two image-capturing functions can be used.

In the description of the flowcharts presented in this specification, although the relation between processes of steps in time is clarified by using representations such as "first", "thereafter, and "subsequently", the processing sequence that is necessary for performing the present invention is not uniquely determined by such representations. In other words, the processing sequence in the flowcharts presented in this specification can be changed in a range in which there is no contradiction. Furthermore, the processes may be performed simultaneously (in parallel).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
a touch panel display; and
a position calculating and control unit that
   a) responsive to a first continuous touch on the touch panel display, receives a position of the first continuous touch on the touch panel display,
   b) generates, using the received position of the first continuous touch, a band or arc, wherein the act of generating the band or arc includes determining two points on the band or arc using both (1) the received position of the first continuous touch and (2) a predetermined index finger to thumb distance,
   c) displays the generated band or arc on the touch panel display,
   d) receives, after display of the generated band or arc on the touch panel display, and via a second continuous touch, a user drag operation along the band or arc displayed on the touch panel display, and
   e) adjusts an imaging parameter based on the received user drag operation.

2. The imaging apparatus according to claim 1, wherein the initial touch position is a position that is touched early in time, a position corresponding to an upper side of the touch panel display in a vertical direction in a plurality of touch positions, a position located on a side not moving, or a position that is determined in accordance with the shape or fingerprint of a specific finger.

3. The imaging apparatus according to claim 2, wherein the position calculating and control unit automatically performs image adjustment of the image for the initial touch position and performs image adjustment of the image in accordance with an operation of sliding an auxiliary touch position.

4. The imaging apparatus according to claim 3, wherein the act of adjusting an image adjusts a capturing parameter.

5. The imaging apparatus according to claim 4, wherein a display area of the touch panel display is a part of an annular shaped area having the initial touch position as a center.

6. The imaging apparatus according to claim 5, wherein operating information is used for performing the act of adjusting an image and includes operation information that is used for adjusting an operation of the imaging apparatus and image adjusting information that is used for adjusting the parameter of the image.

7. The imaging apparatus according to claim 6, further comprising a touch state determining unit that determines a touch state of the touch panel display on the basis of the signal that is output by the touch panel display,
   wherein, in a case where the touch state determining unit detects a touch state in which a touch is performed continuously for a predetermined time within a predetermined range from the initial touch position on the touch panel, the control unit causes the touch panel display to display the operating information.

8. The imaging apparatus according to claim 7, further comprising a trimming image generating unit that generates a trimming image by cutting out an area that includes the initial touch position from the image,
   wherein, in a case where the touch state determining unit detects a touch state in which a touch is performed continuously for a predetermined time within a predetermined range from the initial touch position on the touch panel, the control unit causes the touch panel display to display the trimming image.

9. The imaging apparatus according to claim 8, further comprising an image processing unit that generates an operating information image by performing image processing corresponding to the operating information for the trimming image that is generated by the trimming image generating unit,
   wherein the control unit causes the touch panel display to display the operating information image generated by the image processing unit in the display area as the operating information.

10. The imaging apparatus according to claim 1, wherein the band or arc is defined by at least two points on a second arc that is determined by a trajectory along which a user's thumb can move when the user's index finger is provided at the initial touch position and is used as a center of the second arc.

11. A method for use with an image capturing device having a touch panel display, the method comprising:
   a) responsive to a first continuous touch on the touch panel display, receiving a position of the first continuous touch on the touch panel display;
   b) generating, using the received position of the first continuous touch, a band or arc, wherein the act of generating the band or arc includes determining two points on the band or arc using both (1) the received position of the first continuous touch and (2) a predetermined index finger to thumb distance;

c) displaying the generated band or arc on the touch panel display;

d) receiving, after display of the generated band or arc on the touch panel display, and via a second continuous touch, a user drag operation along the band or arc displayed on the touch panel display; and e) adjusting an imaging parameter based on the received user drag operation.

12. The method of claim 11 wherein the imaging parameter is a parameter selected from a group consisting of (A) an exposure value, (B) a contrast value, (C) a grey scale value, (D) a chroma value, (E) a shutter speed, and (F) a capturing sensitivity.

13. The method of claim 11 wherein the displayed band or arc is located on a radius determined by a trajectory along which a second finger of a user's hand can move when a first finger of the user's hand remains at the received position of the first continuous touch.

14. The method of claim 11 wherein the first continuous touch on the touch panel display is from a user's index finger and wherein the second continuous touch on the touch panel display is from the user's thumb.

15. The method of claim 14 wherein the band or arc is generated based on a relationship between the user's index finger and thumb.

* * * * *